US012352921B2

(12) United States Patent
Capasso et al.

(10) Patent No.: US 12,352,921 B2
(45) Date of Patent: Jul. 8, 2025

(54) SPIN-TO-ORBITAL ANGULAR MOMENTUM CONVERTER FOR LIGHT

(71) Applicant: PRESIDENT AND FELLOWS OF HARVARD COLLEGE, Cambridge, MA (US)

(72) Inventors: Federico Capasso, Cambridge, MA (US); Antonio Ambrosio, Arlington, MA (US); Noah A. Rubin, Cambridge, MA (US); Robert C. Devlin, Cambridge, MA (US); Yao-Wei Huang, Somerville, MA (US)

(73) Assignee: PRESIDENT AND FELLOWS OF HARVARD COLLEGE, Cambridge, MA (US)

( * ) Notice: Subject to any disclaimer, the term of this patent is extended or adjusted under 35 U.S.C. 154(b) by 169 days.

(21) Appl. No.: 16/647,433

(22) PCT Filed: Sep. 14, 2018

(86) PCT No.: PCT/US2018/051208
§ 371 (c)(1),
(2) Date: Mar. 13, 2020

(87) PCT Pub. No.: WO2019/108290
PCT Pub. Date: Jun. 6, 2019

(65) Prior Publication Data
US 2024/0241288 A1 Jul. 18, 2024

Related U.S. Application Data

(60) Provisional application No. 62/559,320, filed on Sep. 15, 2017.

(51) Int. Cl.
*G02B 1/00* (2006.01)
(52) U.S. Cl.
CPC .................................. *G02B 1/002* (2013.01)
(58) Field of Classification Search
CPC ............................. G02B 1/002; G02B 27/286
See application file for complete search history.

(56) References Cited

U.S. PATENT DOCUMENTS 9,503,258 B2   11/2016   Ashrafi et al.
9,728,930 B2    8/2017   Williams et al.
(Continued)

FOREIGN PATENT DOCUMENTS

CN   103336367 B   5/2015

OTHER PUBLICATIONS

Bouchard, Frederic et al., "Optical spin-to-orbital angular momentum conversion in ultra-thin metasurfaces with arbitrary topological charges", Applied Physics Letters 105, 101905 (2014), 5 pages.
(Continued)

*Primary Examiner* — Ephrem Z Mebrahtu
(74) *Attorney, Agent, or Firm* — FOLEY & LARDNER LLP

(57) ABSTRACT

An optical device comprises a metasurface including a plurality of nanostructures. The nanostructures convert an input light of an arbitrary spin state into an output light of an arbitrary total angular momentum state characterized by a superposition of two independent orbital angular momentum (OAM) states.

18 Claims, 16 Drawing Sheets

(56) References Cited

U.S. PATENT DOCUMENTS

2012/0092668 A1   4/2012  Du et al.
2016/0111781 A1*  4/2016  Matteoni .............. H01Q 15/08
                                                   343/911 R
2018/0069631 A1*  3/2018  Ashrafi ............... G02B 6/2726

OTHER PUBLICATIONS

Devlin, Robert C. et al., "Arbitrary spin-to-orbital angular momentum conversion of light", Science 358, Nov. 17, 2017, pp. 896-901.
Huang, Yao-Wei et al., "Versatile total angular momentum generation using cascaded J-plates", Optics Express, vol. 27, No. 5, Mar. 4, 2019, 16 pages.
International Search Report and Written Opinion for International Patent Application No. PCT/US18/51208, mailed Apr. 30, 2019, 10 pages.
Yi, Xunong et al. "Generation of cylindrical vector vortex beams by two cascaded metasurfaces", Optics Express, vol. 22, No. 14, Jul. 14, 2014, 9 pages.

* cited by examiner

US 12,352,921 B2

SPIN-TO-ORBITAL ANGULAR MOMENTUM CONVERTER FOR LIGHT

STATEMENT OF FEDERALLY SPONSORED RESEARCH OR DEVELOPMENT

This application is a National Stage Entry of International Application No. PCT/US2018/051208, filed on Sep. 14, 2018, which claims the benefit of and priority to U.S. Provisional Patent Application 62/559,320, filed Sep. 15, 2017, which is incorporated herein by reference in its entirety.

CROSS-REFERENCE TO RELATED APPLICATIONS

This invention was made with government support under 1144152 awarded by National Science Foundation (NSF) and under FA9550-09-1-0156-DOD35 awarded by U.S. Air Force Office of Scientific Research (AFOSR). The government has certain rights in this invention.

BACKGROUND

In 1909, it was Poynting who realized that circular polarized light has spin angular momentum (SAM). Beam's SAM has a value of $S=\sigma\hbar$ per photon, where $\sigma$ is $\pm 1$. The orbital angular momentum (OAM), however, is independent of the beam's polarization. It arises from helical phase front. The Laguerre-Gaussian modes have been widely used for laser application. But it was till 1992, a beam is realized with azimuthal phase difference $e^{il\varphi}$ has OAM $L=l\hbar$ per photon, where l is an integer. There is a phase singularity at the axis and the Poynting vector of a beam with OAM follows a spiral path around the axis. It results in annular intensity profile and spiral interference pattern obtained with another reference beam. The total angular momentum is a sum of the spin and orbital contributions $J=(l+\sigma)\hbar$ per photon. It is hard to detect the SAM and OAM of a single photon but not for a light beam. The spin can be measured by using half-wave plate and a polarizer and the OAM quantum number by observing the number of arms in the interference pattern.

SUMMARY

According to at least some embodiments of the present disclosure, a technology and an optical device (J-plate) are disclosed to convert an arbitrary spin state of light into an arbitrary total angular momentum state (OAM) characterized by a superposition of two independent OAM states. For example, such a device can convert left-circularly and right-circularly polarized light into helical beams with independent values of OAM. Such a device can also perform the same operation for any orthogonal elliptical polarizations.

The disclosed technology and device can be used in various applications. For example, in telecommunications, a goal for research and development is to encode as much information as possible in a single photon. Angular momentum of light is one such tunable parameter. The disclosed device allows new combinations of photon pairs that can be used in secure data transmission. The disclosed device can be used for structured light. Helical modes of light carrying orbital angular momentum have non-trivial field distributions (structured light) when focused by a high numerical aperture lens. The structured light can be used for, e.g., lithography, optical manipulation of micro-objects in optical tweezers, and ultramicroscopy such as stimulated emission depletion (STED) microscopy. The disclosed device can be used to build lasers that emit light carrying orbital angular momentum, ready for applications such as in telecommunications or as structured light.

BRIEF DESCRIPTION OF THE DRAWINGS

For a better understanding of the nature and objects of some embodiments of this disclosure, reference should be made to the following detailed description taken in conjunction with the accompanying drawings.

DETAILED DESCRIPTION

Description of J-Plate Device

Figure 1A:
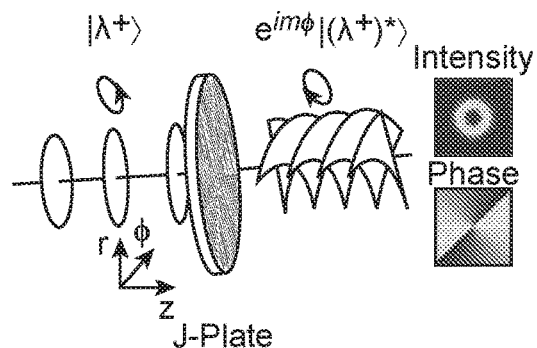
FIG. 1 shows arbitrary spin-to-orbital angular momentum conversion. (A) Schematic diagram of the concept for arbitrary SOC. Light with an arbitrary spin state (elliptical polarization), $|\lambda_+\rangle$, propagating along the z-axis is incident on the J-plate. The J-plate imprints a helical phase profile on the output beam resulting in orbital angular momentum (OAM) $m\hbar$, where m is any integer, and flips the handedness of the incident polarization. (B) For light incident on the same device with an orthogonal polarization state $|\lambda_-\rangle$, the device imprints OAM of $n\hbar$, where in general n is independent of m and again flips the handedness of the polarization. (C) Schematic of typical J-plate design used to carry out the function in (A) and (B). The units have a given height, h, (top inset) and by changing their width along the x- and y-directions, $w_x$ and $w_y$ (bottom inset) the structures implement phase shifts given by $\delta_x$ and $\delta_y$, respectively. Each unit is also allowed to have an independent orientation angle, $\theta$. (D) Required phase shifts, $\delta_x$ and $\delta_y$ (top) and rotation angle (bottom) as a function of the azimuthal coordinate $\varphi$. The particular case plotted here is for designed input spin states that are left and right circularly polarized and for OAM states m=+3 and n=+4. (E-G) Scanning electron micrographs of fabricated device for the case of mapping from circularly polarized states to helical beams with OAM values of m=+3 and n=+4. The SEMs show a top view (E) angled view (F) and zoomed view of the device center (G)

The interaction of spin (SAM) and orbital angular momentum (OAM) of light gives rise to many physical phenomena and applications in classical and quantum optics. However, no single optical element has yet provided controllable and arbitrary coupling between SAM and OAM. The present disclosure describes a device (metasurface) that converts arbitrary spin states into a total angular momentum state characterized by a superposition of two independent OAM states. Experiments demonstrate a device (J-plate) that converts left- and right-circularly polarized light into helical beams with independent values of OAM and another device that performs the same operation for orthogonal elliptical polarizations. Structured light is created with complex optical vortices which for applications in quantum and classical information.

Circularly polarized light carries spin angular momentum (SAM) of $\pm\hbar$ per photon depending on the handedness, while a general state of polarization (elliptical) is a superposition of ±1 spin states. Electromagnetic fields with an azimuthal phase dependence of the form $\exp(il\phi)$, where l is any integer, carry orbital angular momentum (OAM). Beams with the azimuthal structure, known as helical waves or optical vortices, have l discontinuities in the phase, which is undefined at the beam center, resulting in a 'doughnut' intensity profile. In contrast to SAM, the OAM can take on any integer value from $-\infty$ to $+\infty$ corresponding to $l\hbar$ angular momentum per photon. A paraxial, circularly polarized, helical beam can be shown to carry a total angular momentum (TAM) of $J=(\sigma+l)\hbar$, where $\sigma=\pm1$, per photon.

As light carries OAM, optical vortices can be used in a number of potential applications due to the complex field distribution of helical beams and their infinite set of orthogonal basis states. Applications include high capacity optical information transfer, optical forces and manipulation, and super resolution imaging. The quantum nature of the photon's OAM can be also exploited through entanglement and allows for quantum communication schemes with higher dimensional quantum states. In general, beams with OAM can be generated through a variety of different techniques: such as laser mode conversion, forked holograms, spiral phase plates, and spatial light modulators. Such techniques rely on introducing a phase discontinuity in the wavefronts but generally establish no connection between the SAM and OAM of the beam.

In contrast, geometric phase optical elements provide a direct connection between the SAM and OAM of light. These devices may include identical (or similar) subwavelength-spaced halfwave plates with a spatially-varying orientation and are referred to as q-plates since they perform the transformation $|L\rangle \rightarrow e^{i2q\phi}|R\rangle$ and $|R\rangle \rightarrow e^{i2q\phi}|L\rangle$, where the input SAM state (e.g., left or right circular polarization) is converted to an output TAM state of opposite spin and $\pm 2q\hbar$ OAM. This process is referred to as spin-orbit-conversion (SOC) and it falls into a class of phenomena spin-orbit-interaction (SOI) of light, where the spin degree of freedom couples to a spatial degree of freedom. In addition to providing a fundamental connection between the SAM and OAM of light, these devices have broadened the applications of angular momentum in light including direct generation of OAM from lasers and innovative quantum devices. However, due to the symmetry of the devices-only the rotation angles of the elements vary—SOC may have two inherent limitations. First, the output OAM states are not independent but are conjugate values ($+2q\hbar$). Second, the mapping from SAM is limited to left-circular and right-circular polarizations, which represent only two of an infinite set of possible polarizations. Even in the broader context of SOI of light, the coupling is generally conjugate for the two input polarizations.

The design of a disclosed optical element overcomes the above limitations by providing conversion from any orthogonal SAM states to independent OAM states. The design uses metasurfaces because of their ability to control polarization and phase distribution. In addition, however, this element can be implemented by any medium that allows both birefringence and orientation angle of the fast axis to vary spatially. The full set of output states of the device is examined, which shows that this technique provides a way to produce arbitrary superpositions of TAM states of light. To experimentally verify this design, devices are demonstrated to map SAM to OAM for at least two cases. First it is shown that two circularly polarized beams of opposite handedness can be converted into helical beams with independent values of OAM, a freedom not afforded by any comparative device. It is also shown that the conversion of arbitrary and orthogonal elliptical polarizations into two TAM states with independent values of OAM, which is the most general form of spin-to-orbit conversion. Because of its ability to map SAM to two arbitrary output TAM, the disclosed device is referred to as J-plate.

Arbitrary Spin-to-Orbital Angular Momentum Conversion

A present disclosure describes a design technique for converting arbitrary and orthogonal SAM states of light to an arbitrary superposition of states with independent values of OAM. This design currently represents the most general material-mediated connection between the spin angular momentum and orbital angular momentum of light and can produce arbitrary superpositions of TAM states of light. Experiments demonstrate the operation of the J-plate for spin-orbit conversion from two input circular polarizations to two independent output states and for input elliptical polarizations in general. In addition to demonstrating this general mapping, it is also shown that with a single optical device, controllable structured light, such as complex optical vortex patterns, can be created where the input SAM and output OAM states uniquely determines these spatial distributions.

The generalized spin-orbit-coupling obtained by the disclosed device, as a new fundamental connection between SAM and OAM of light, can be used in various applications and lead to various research and development directions. The compact nature of the J-plate, including, e.g., a single-layer of material to produce arbitrary TAM states, makes the device easily integrateable in a variety of platforms. For example, the device can be directly integrated into a laser cavity to produce high purity, independent TAM states. These states that use both polarization and spatial structure of the field can increase classical information transfer. The complex, tunable intensity profiles can be used for laser fabrication of materials, optical micromanipulation, and imaging in STED microscopy. In addition to macroscopic fields, the device can be used at the single photon level. Thus, the J-plate can provide a new tool for quantum communications protocol, especially for cases that rely on transfer from polarization entanglement to OAM entanglement, rather than parametric down conversion. This device can be used to study complex spin-orbit interactions in atomic systems. Furthermore, more than one J-plate, e.g., cascading devices, especially those designed for different input polarizations, can be used, e.g., to create a plurality of independent OAM modes.

Figure 1B:
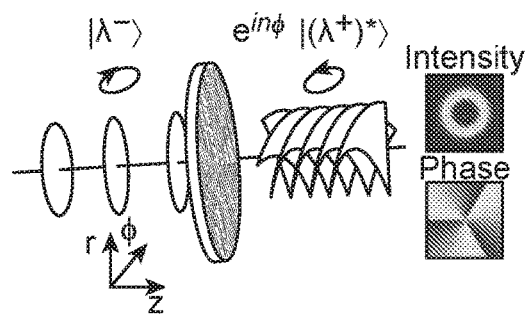

FIGS. 1A and 1B show a schematic of the generalized mapping performed by the J-plate element. An incident paraxial beam in cylindrical coordinates (r, φ, z) propagate along the +z-direction. If the incident beam is in some arbitrary polarization state $|\lambda^+\rangle$ (shown in FIG. 1A), which in general is an arbitrary superposition of photon SAM states (circular polarizations), the device performs the transformation $$|\lambda^+\rangle \to e^{im\phi}|(\lambda^+)^*\rangle. \quad (1)$$

That is, the output conjugate polarization state $|(\lambda^+)^*\rangle$ has the opposite handedness, and the beam has acquired an azimuthally-dependent phase factor $e^{im\phi}$, where m is any integer. Because of this azimuthal phase factor, the output beam has m helically-intertwined phase fronts resulting in m2π phase discontinuities in a round-trip about the optical axis and an annular intensity profile (See FIG. 1A, right inset). Thus, the beam acquires mℏ OAM. If a beam in an orthogonal SAM state, $|\lambda^-\rangle$, is incident on the same device, the conversion from SAM leads to an independent OAM state. This case is shown in FIG. 1B, where the mapping carried out is $$|\lambda^-\rangle \to e^{im\phi}|(\lambda^-)^*\rangle. \quad (2)$$

For this case, the output beam has acquired an azimuthal phase factor of $e^{im\phi}$ corresponding to OAM of nℏ, which is in general different from m.

To implement this mapping, a single device may independently control the phase shift imprinted on two orthogonal input polarizations states. This amounts to finding a single operator (e.g., device matrix) that acts independently on the two input SAM states. First, considering the two arbitrary, orthogonal polarization states introduced above in the linear polarization basis $$|\lambda^+\rangle = \begin{bmatrix} \cos\chi \\ e^{i\delta}\sin\chi \end{bmatrix} \quad |\lambda^-\rangle = \begin{bmatrix} -\sin\chi \\ e^{i\delta}\cos\chi \end{bmatrix}, \quad (3)$$

where χ and δ set the polarization state. To carry out the mapping from these SAM states to OAM states, Eq. 1 and 2, the action of the device in relating the desired input states to the desired output state is needed. The connection between the input and output states of an optical device can be expressed by Jone's matrix and for the case of arbitrary SOC, using linearly birefringent elements, this matrix is $$J(\phi) = \begin{bmatrix} e^{i\delta}(e^{im\phi}\cos^2\chi + e^{in\phi}\sin^2\chi) & \frac{\sin 2\chi}{2}(e^{im\phi} - e^{in\phi}) \\ \frac{\sin 2\chi}{2}(e^{im\phi} - e^{in\phi}) & e^{-i\delta}(e^{im\phi}\sin^2\chi + e^{in\phi}\cos^2\chi) \end{bmatrix}, \quad (4)$$

where δ and χ define the polarization states in Eq. 3, m and n are any real numbers and set the output OAM and φ is the azimuthal coordinate. This device matrix provides the most general mapping from orthogonal SAM to independent OAM states and makes no assumptions on the specific values. To see that Eq. 4 carries out the mapping, the output state from the device can be found as $|E_{out}\rangle = J(\phi)|E_{in}\rangle$. When the input polarization is chosen to be $|E_{in}\rangle = |\lambda^+\rangle$ the output can be found to be $e^{im\phi}|(\lambda^+)^*\rangle$. Similarly, for the orthogonal input state $|\lambda^-\rangle$ the output is $e^{in\phi}|(\lambda^-)^*\rangle$.

In addition to the two orthogonal design polarization states, the device works for any input polarization, $|E_{in}\rangle = \alpha|\lambda^+\rangle + \beta|\lambda^-\rangle$, where α and β are complex coefficients. In such a case, the output state is a superposition of the two eigenstates, $$|E_{out}\rangle = J|E_{in}\rangle = \alpha e^{im\phi}|(\lambda^+)^*\rangle + \beta e^{in\phi}|(\lambda^-)^*\rangle. \quad (5)$$

For simplicity, considering the case where the incident beam has zero OAM, that is, the device transfers an incident beam with SAM to an output with OAM. However, the device is capable of acting on an incident beam with OAM as well. In such a case, the mapping is $$e^{il\phi}|\lambda^+\rangle + e^{i(m+l)\phi}|(\lambda^+)^*\rangle \quad (6)$$
$$e^{ip\phi}|\lambda^-\rangle + e^{i(n+p)\phi}|(\lambda^-)^*\rangle,$$

where again l and p are also arbitrary integers and for the case that m=n=0 the case discussed above is recovered.

Figure 1C:
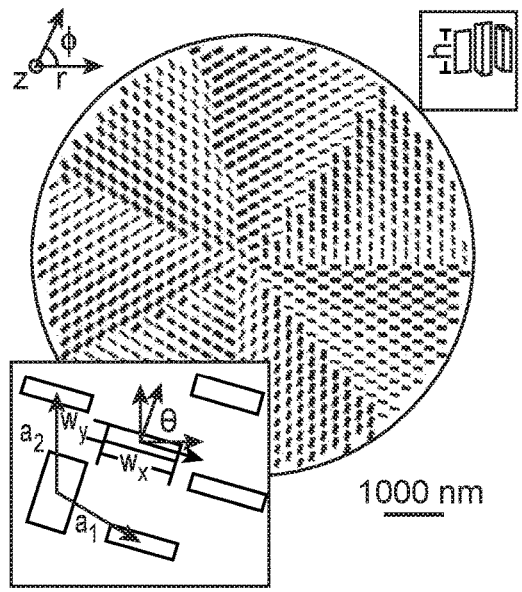

Based on the form of the Jones matrix producing arbitrary conversion from SAM to OAM, a physically-realizable optical element can be produced. Since Eq. 4 assumes linear birefringence, it can be determined the orientation angle of the fast axis and birefringence as a function of the coordinate φ by finding its eigenvectors and eigenvalues, respectively. Optical element generally cannot provide continuous spatial variation of both linear birefringence as well as the orientation angle of the fast axis. Metasurfaces, however, which includes subwavelength-spaced, birefringent phase-shifters, allow one to discretize a continuous phase function. This concept is shown schematically in FIG. 1C. Discrete optical elements are arranged periodically in two dimensions with periods a1 and a2. For some fixed height, h (top inset), changing the element widths $w_x$ and $w_y$ (bottom inset) allows controlling the phase shifts $\delta_x$ and $\delta_y$. The orientation angle of each element, $\theta$, can also be independently varied (bottom inset) and thus, each element acts as a local, subwavelength waveplate with designable birefringence and orientation. Compared to SOCs based on the geometric phase, the difference here is that by allowing both the phase shifts and orientation angle vary as a function of coordinate $\phi$ (as opposed to orientation angle alone) the device can decouple the output OAM states from any input SAM state.

For the specific case of circular polarization, $\chi=\pi/4$ and $\delta=\pi/2$, but for any two values of OAM, m and n, analytical solutions for the required phase shifts and orientation angles can be expressed as a function of azimuth $$\theta = \frac{1}{4}(m-n)\phi \quad (7)$$

$$\delta_x = \frac{1}{2}(m+n)\phi \quad (8)$$

$$\delta_y = \frac{1}{2}(m+n)\phi - \pi \quad (9)$$

Figure 1D:
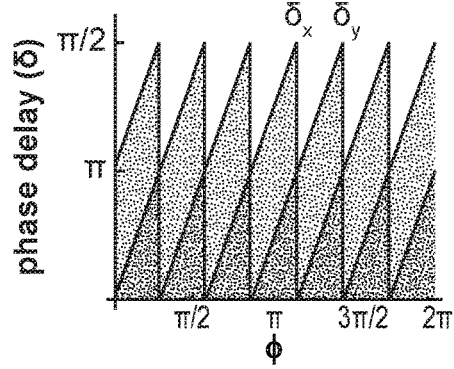
Figure 1D:
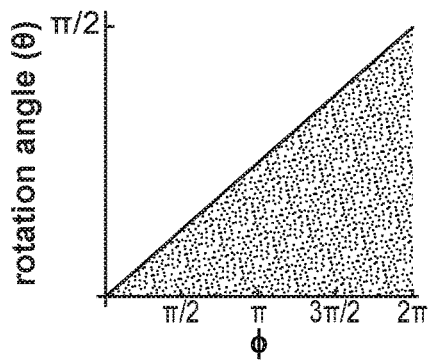
Figure 1E:
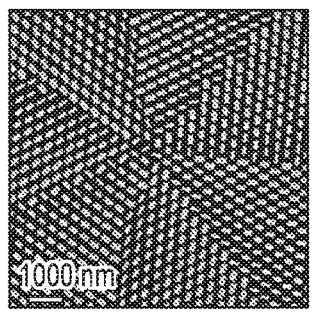
Figure 1F:
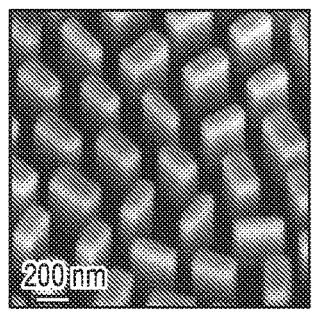
Figure 1G:
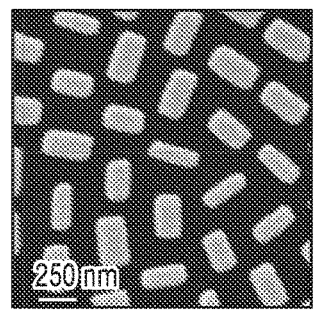

These equations provide the prescription to map left and right circular polarizations to any two values m and n. In FIG. 1D, these equations are plotted as a function of $\phi$ for a specific case, where m=+3 and n=+4. In the top panel of FIG. 1D shows the variation of the phase shifts $\delta_x$ and $\delta_y$, modulo $2\pi$. FIG. 1D shows the (m+n)$2\pi$ phase jumps in the plot. This can readily be observed in the device itself, schematically shown in FIG. 1C, where there are m+n=7 segments. For the more general case of elliptical polarizations the solutions are not amenable to such succinct expressions but may be calculated numerically for specific values of m, n, $\chi$, and $\delta$. This case is discussed in more detail below.
Mapping from Circular Polarizations to Two Beams with Arbitrary Values of Orbital Angular Momentum For the experimental realization of the J-plate, the devices are fabricated using a process that allows produce devices with high fidelity and high efficiency that operate at, e.g., visible wavelengths with $TiO_2$ as a material platform. The devices may be optimized to operate at a wavelength of, e.g., about 532 nanometers (nm), but the same design principle can be applied for any wavelength. To fully characterize a beam with OAM, both the intensity and phase distributions of the beam are characterized. As such the device performs interference measurements in a standard Mach-Zehnder configuration.

To provide comparison to comparative geometric-phase SOCs, a device is demonstrated to provide a transfer from circularly-polarized input states to two output helical beams with independent values of OAM. The full set of superposition states created by this device is examined. Choosing the specific mapping to be $|R\rangle \rightarrow |L\rangle |+3\rangle$ and $|L\rangle \rightarrow |R\rangle |+3\rangle$, carried out by the device as shown in FIG. 1. Note that the azimuthal phase factor is denoted as $|m\rangle$, for brevity and to show more explicitly that the output of the J-plate is a TAM state, a direct product between SAM and OAM states.

Figure 2A:
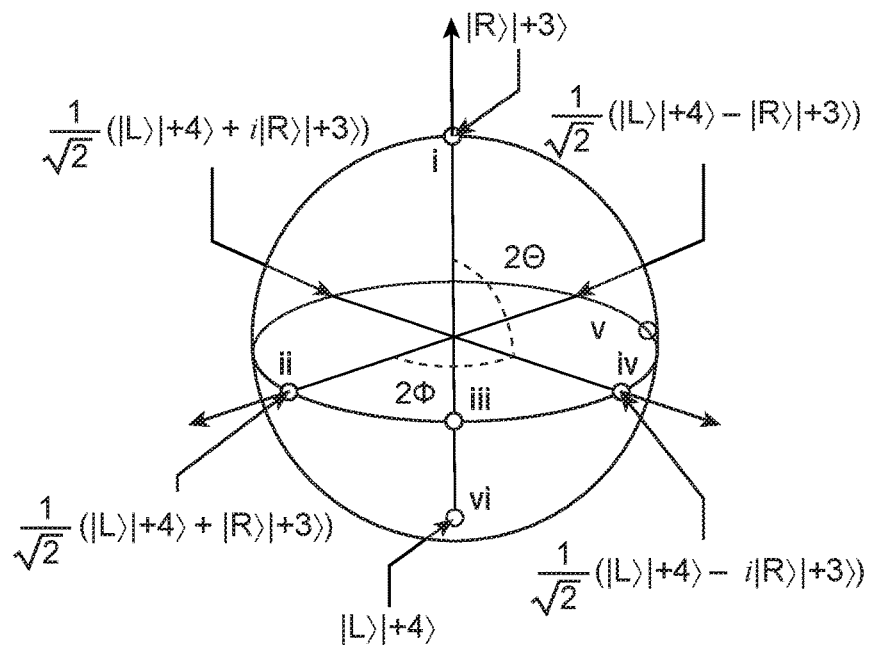
FIG. 2 shows experimental demonstration of mapping from circular polarizations to two beams with arbitrary values of orbital angular momentum. (A). Higher order Poincare sphere (HOPS) representing all possible spin and orbital angular momentum states produced by a device (FIG. 1) that carries out the mapping $|R\rangle \rightarrow |L\rangle|+4\rangle$ and $|L\rangle \rightarrow |R\rangle|+3\rangle$. (B-E). Measured and calculated output states of the device. The states in (B-E) i-vi are marked as circles on the HOPS in (A). Measured (B) and calculated (C) intensity of the output states. Scale bar below shows normalized intensity. Measured interference (D) and calculated phase (E) of output states. Scale bars below show the phase value. (F,G) Expanded view of measured interference and calculated phase of intensity of output state in (D)iii and (E)iii. The dashed boxes highlight an additional phase discontinuity that results from the equal superposition of $|+3\rangle$ and $|+4\rangle$ states. This phase discontinuity results in an off-axis fork in the interference pattern (F) corresponding to an additional off-axis 0 to $2\pi$ phase jump (G). The scale bar shows the value of phase.
Figure 2B:
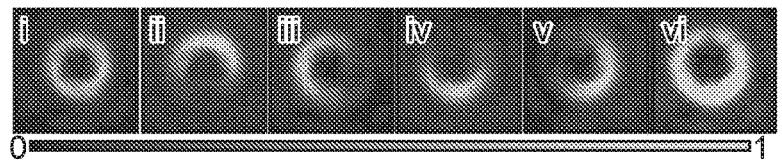
Figure 2C:
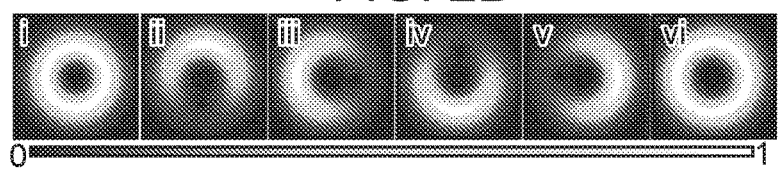
Figure 2F:
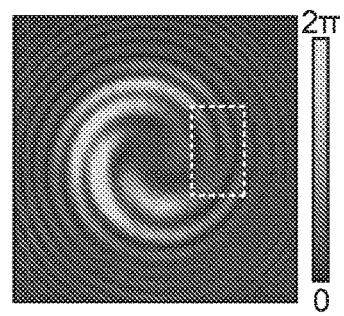
Figure 2D:
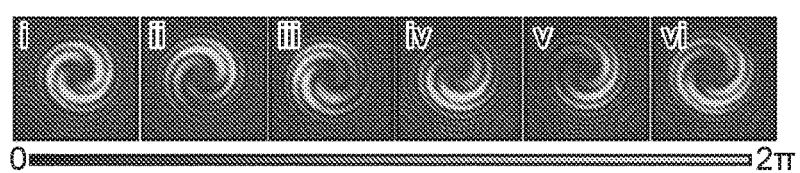
Figure 2E:
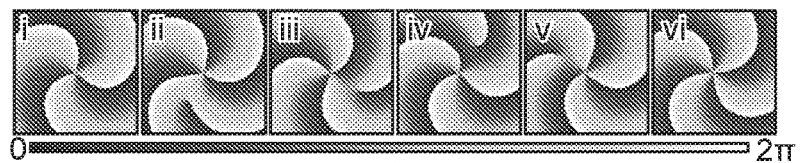

The full set of output states from this J-plate can be succinctly represented on a sphere whose poles are the two output TAM states and all other points are superpositions of these two states. This sphere that combines both SAM and OAM is called the higher order Poincare sphere (HOPS) in contrast to comparative Poincare sphere for polarization states. While the original HOPS was derived for conjugate states of OAM on the poles it remains valid even when these states are completely independent, as is the case here. FIG. 2A shows the HOPS for the two design states introduced above. All the cardinal points of the sphere are labelled and it is shown that the poles correspond to states $|R\rangle |+3\rangle$ and $|L\rangle |+4\rangle$, respectively. All other possible outputs from this device correspond to a point on the HOPS represented by the angular coordinates $\Phi$ and $\theta$ (marked inside the sphere of FIG. 2A). Thus, any TAM state of the device can be written as $$|\Psi\rangle = \cos(\Theta) |L\rangle |+4\rangle + \sin(\Theta) \exp(i2\Phi) |R\rangle |+3\rangle,$$

where $\theta$ ranges from 0 to $\pi/2$. The states along the equator of the sphere are equal weights of the eigenstates $1\sqrt{2}(|R\rangle |+3\rangle + \exp(i2\Phi)|L\rangle |+4\rangle)$ FIGS. 2B-2E show the measured and calculated results verifying the operation of the J-plate. The labels on each figure (i-vi) correspond to the states indicated by the circles on the HOPS of FIG. 2A. FIGS. 2B(i) and (vi) and FIGS. 2C(i) and (vi) show the measured and calculated intensities for incident left and right circularly polarized light, respectively. These intensity profiles are a single-ringed annuli with zero intensity as r→0. The radius of maximum intensity, $r_{max}$, is larger in FIG. 2B(vi) as compared to FIG. 2B(i) indicating that the magnitude of OAM for the prior case is greater than the latter. In order to verify the OAM of a beam, interference measurements can be performed. The measured interference pattern corresponding to the intensities in FIGS. 2B(i) and (vi) are shown in FIGS. 2D(i) and (vi). It is shown that 3 and 4 arms, respectively, in the spiral interference patterns, converge on the beam axis. FIGS. 2E(i) and (vi) show the calculated phase distribution of the two states, which have 3 and 4 phase discontinuities, respectively. These observations are consistent with the two states being pure OAM states, rather than superpositions, and consistent with the two intended output OAM states for this J-plate, $|+3\rangle$ and $|+4\rangle$. Notably, these values of OAM are not conjugate values.

Figure 2G:
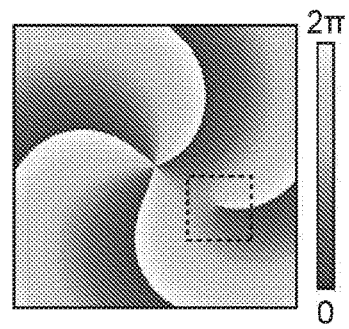

To further verify the operation of the device, the evolution of an equal superposition of the two design states on the HOPS is explored. To produce this state, linearly polarized light is fed into the J-plate as input, which results in an equal superposition of the two eigenstates for any angle of the input linear polarization. Changing the angle of the linear polarization introduces a relative phase shift between the two TAM states and corresponds to changing longitude at a fixed latitude on the HOPS. The measured intensity for these cases are shown in FIG. 2B(ii-v). Since these states are a superposition of two beams with different values of OAM, it is shown that an additional $|m-n|$ zeros to develop in the intensity away from the beam center, in this specific case $|3-4|=1$. As shown from the measured and calculated intensities in FIGS. 2B and C(ii-v), in addition to the zero in intensity at the beam center, an additional zero has developed at a radially-off-axis position. This zero in intensity is also an optical vortex and for the superposition of two OAM beams where m≠n and m<n there should be m vortices at the beam center and |m−n| vortices off axis, which again for this specific case corresponds to m=3 and |3−4|=1. This is the phase structure of the beam observed from the interference measurements and phase calculations, shown in e.g., FIGS. 2D(ii-v) and E(ii). FIG. 2F and FIG. 2G show expanded views of the measured interference and calculated phase for one of these equal superpositions in order to illuminate the more subtle features of the phase. As the angle of the input linear polarization is changed from 0 degree (horizontal) to about 66.75 degrees, which corresponds to changing the relative phase exp(i2Φ) between the two states from Φ=0 to 3π/4, all of the features (zero in intensity and additional off-axis vortex) rotate (this corresponds to moving from (ii) to (v) in FIGS. 2B-E). This can be understood qualitatively by noting that the relative phase shift changes the angle where destructive interference occurs; the positions of the intensity minima agree with quantitative expectations.

Evolution of Device Output Along a Path on the Higher Order Poincare Sphere

Figure 3:
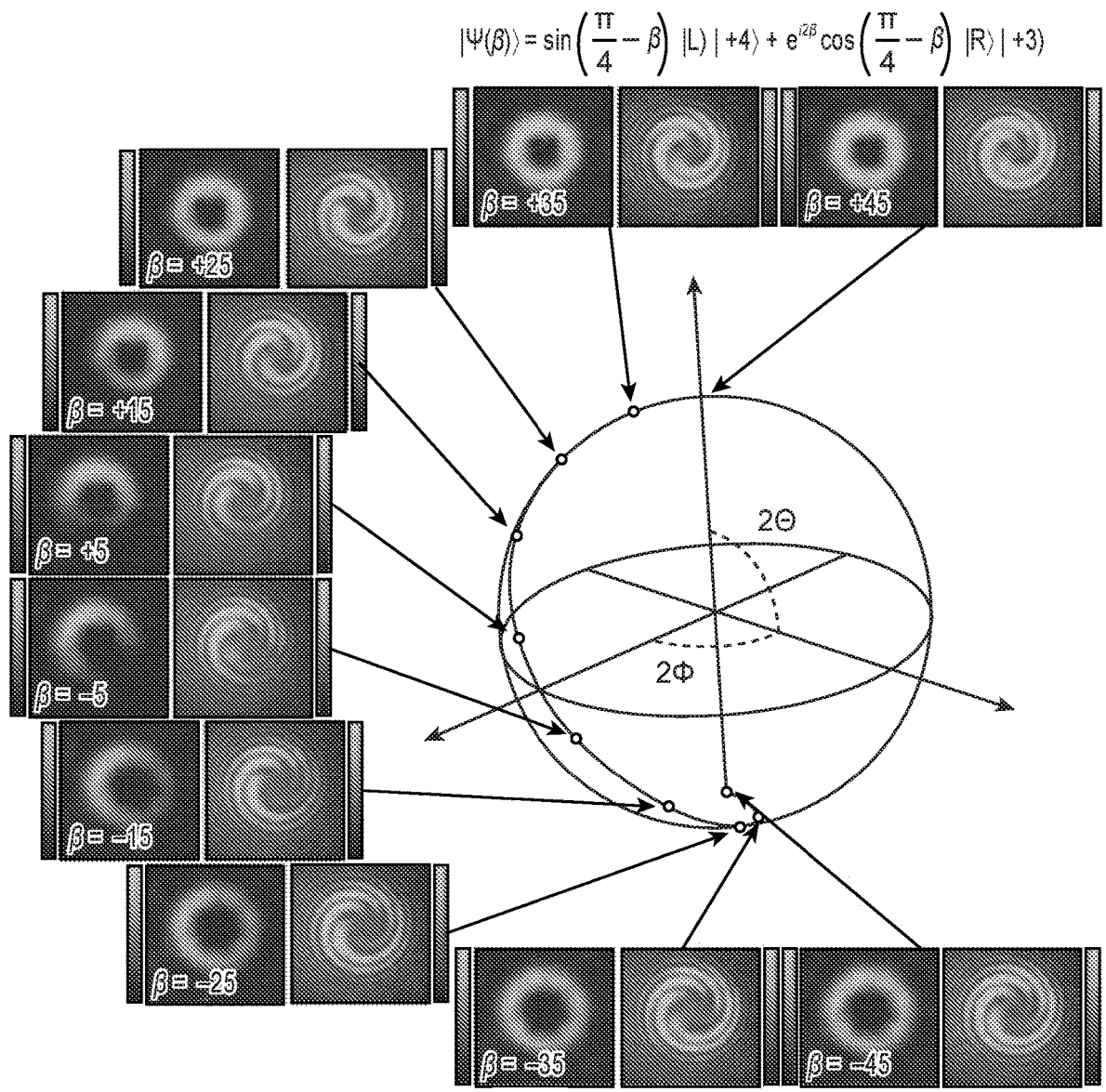
FIG. 3 shows evolution of device output along a path on the higher order Poincare sphere. The images show measured output intensities (left) and interference (right) for the device in FIG. 2, as the angle of the fast axis of a QWP is varied in front of a horizontally-polarized laser. The QWP angle is varied from $\beta=45$ degrees to $-45$ degrees which transfers the output state from the north pole to the south pole while continuously changing both the weights and phases of the superposed states. The QWP angle for each intensity and interference image is displayed in the bottom left. The scale bars for the normalized intensity (left image) range from 0 to 1 and for the interference (right image) range from 0 to $2\pi$. The output state $|\Psi\rangle$ as a function of $\beta$, is shown at the top. The resulting path taken on the HOPS is shown as the line and the circles correspond to the measured points.

It is shown that the device produces the two independent TAM states and the effect of a phase difference between equal superpositions of the |R⟩ |+3⟩ and |L⟩ |+4⟩ TAM states. In addition, the device can also continuously vary the superposition of these states in both magnitude and phase. FIG. 3 depicts the continuous evolution from the |R⟩ |+3⟩ and |L⟩ |+4⟩ state as a function of changing input polarization to the J-plate. To vary the input polarization, It is sufficient to change the angle of the fast axis of a quarter wave plate (QWP) in front of a horizontally polarized laser. The resulting path taken on the HOPS is shown as the line in FIG. 3 and winds from the north pole, |R⟩ +3⟩ to the south pole in a half figure eight pattern, |L⟩ +4⟩. The output state can be expressed as a function of the QWP fast axis angle, β, showing that total output state is given by $$|\Psi(\beta)\rangle = \sin\left(\frac{\pi}{4} - \beta\right) |L\rangle |+4\rangle + e^{i2\beta}\cos\left(\frac{\pi}{4} - \beta\right) |R\rangle |+3\rangle.$$

Note that for the cases of β=+45 degrees and β=−45 degrees, the input polarization is left or right circular polarization and the TAM state corresponds to one of the design eigen-polarizations. The angle β of the QWP can be related back to the coordinates on the HOPS as θ=π/4−β and Φ=B. The measured intensity and interference images for 10 values of β are shown surrounding the sphere in FIG. 3. As the value of β is changed from +45 degrees to −45 degrees the interference pattern, initially composed of 3 on axis spiral arms, develops an extra vortex at the periphery of the image. As β approaches −45 degrees, this additional vortex moves closer and closer to the beam center until, eventually at −45°, the spiral interference pattern has 4 arms, indicating that the state now has OAM of +4. This shows the continuous evolution between the two design states.

Conversion from SAM to OAM States with m=6 and n=3

Figure 4:
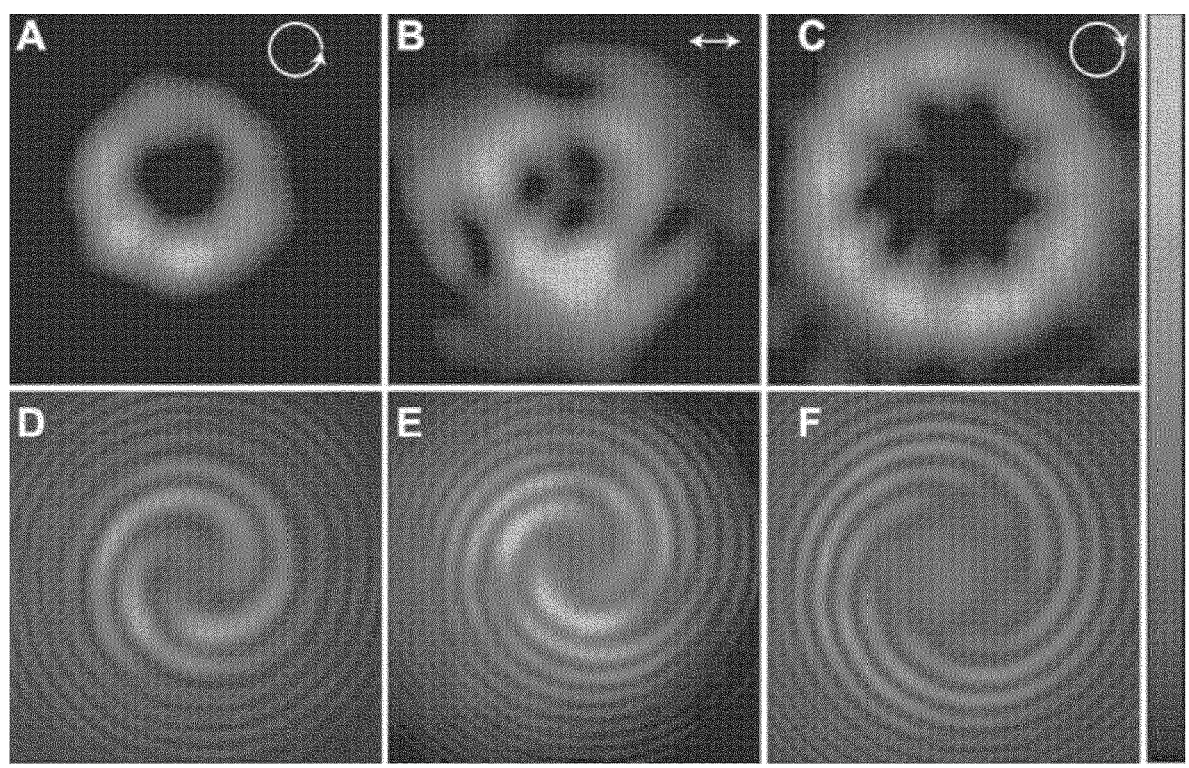
FIG. 4 shows conversion from spin angular momentum (SAM) to orbital angular momentum (OAM) states with m=6 and n=3. (A-C) Measured output intensities for input polarizations: (A) left circular, (B) horizontal, and (C) right circular. (D-F) Measured interference patterns corresponding to the intensities in (A-C), respectively. Input left circular polarization produces three arms in the spiral interference pattern (D). Input horizontal polarization produces an intensity pattern with three additional minima off-axis (B) and an additional vortex in the interference pattern at the location of each intensity minima (E). Input right circular polarization produces a larger beam radius (C) and six arms in the spiral interference pattern (F). The scale bar to the right shows normalized intensity from 0 to 1.

This demonstrates the case where SOC has been carried from two input circular polarization states to two independent TAM states. In addition to producing an arbitrary TAM state with polarization controllable phase and amplitude, the results in FIGS. 2 and 3 show that, due to the spatial intensity profile of the two OAM beams, this device also allows producing and controlling the complex spatial intensity profiles. Although the device can be chosen to demonstrate this arbitrary SOC with a relatively simple case where the two output OAM values differ only by one, |m−n|=1, the device as disclosed can create outputs with any two values of OAM. To demonstrate this experimentally, a device is shown to convert circular polarizations to OAM states of m=3 and n=6. The results are summarized in FIG. 4 with FIGS. 4A-4C showing the output intensity for input left circular, horizontal and right circular polarization, respectively and FIG. 4D-4F showing the corresponding interference patterns. The output intensity and interference patterns of the device for other states of incident polarization are shown. These data further illustrate the ability of J-plates to create complex patterns of structured light. Note that while in FIG. 3 a relatively simple path along the HOPS is chosen, with the same setup, a QWP followed by a J-plate, any output for any state on the HOPS can be generated. This is achieved by allowing the J-plate axis to also rotate independently with respect to the QWP angle β.

Having demonstrated mapping from input circularly polarized states to two unique output OAM states, a general case of SOC can be also demonstrated with a mapping from arbitrary, orthogonal SAM states (elliptical polarizations) to two independent output TAM states. For this demonstration input polarizations in Eq. 3 can be chosen corresponding to χ=π/6 and δ=3π/10 and map to two OAM states m=−3 and n=+4. FIG. 4A shows a schematic of the device that can experimentally verify this mapping. In addition to the normal azimuthal phase factor that imprints OAM onto the output field, an additional constant phase gradient can be added to cause each output beam to be deflected by ±10 degrees from the z-axis, respectively. This is in contrast to the device measured in FIGS. 2 and 3 where the two output states always propagate co-linearly after exiting the J-plate. Spatially separating the two TAM states allows varying the input polarization $|E_{in}\rangle$ and to independently monitor the intensity at each output angle. The advantage of this approach is that the device can perform Stokes polarimetry and unequivocally determine the realized eigen-polarizations of the device and compare it to the designed eigen-polarizations polarizations.

The results of this measurement are shown in FIGS. 4B-4G. It is verified that the two output beams contain the designed values of OAM. FIG. 4B shows the measured intensity distribution for six input polarizations (shown at the bottom of each set of images). Images are collected at angles of +10 degrees and −10 degrees away from the z-axis corresponding to the designed QAM states of |+4⟩ (FIG. 4B top) and |−3⟩ (FIG. 4B bottom), respectively. First, note that the beam radii of two outputs are different, with the max intensity corresponding to |+4⟩ occurring at a larger radius than the case of |−3⟩. The fact that these two beams carry the two designed, independent values of OAM is confirmed through interference measurements (FIGS. 4C and D). It is observed 4 arms in the spiral interference pattern of FIG. 4C while FIG. 4D has 3 arms in the interference pattern. Additionally, because of the sign difference between the two OAM states, the phase fronts of the two OAM beams have opposite handedness. This is confirmed as the sense of rotation of the two interference patterns in FIGS. 4C and 4D are opposite.

To verify that the device is performing the desired SOC from an elliptically-polarized input to two TAM states, the power is measured at each output angle, ±10 degrees and for each input polarization in FIG. 4B and perform Stokes polarimetry. As the input polarization to the device is changed from horizontal to diagonal through to circular, it is observed that the relative output intensities of the two beams vary. The power of each beam is measured for each input polarization and calculate the eigen-polarizations for the actual device. FIG. 4E shows the HOPS corresponding to the device measured here. The circles on the HOPS are the two designed output TAM states and the dashed arrow passing through these two points highlights that the designed polarization states no longer correspond to circular polarizations. The circles the sphere are the measured polarizations states which have numerical values of $\chi=\pi/6.04$ and $\delta=3.43\pi/10$ and closely correspond to the desired design polarization. FIGS. 4F and 4G show plots of the two polarization ellipses for the designed and measured eigen-polarizations. Coupled with the intensity measurements (FIG. 4B) and the interference measurements (FIGS. 4C and 4D), this shows a general form of coupling from arbitrary SAM states to two independent TAM states.

Derivation of the J-Plate Design Matrix

In order to allow the J-plate to be realized with a straight-forward fabrication process and a single layer of material, phase modulation of an incident beam (no amplitude modulation) may be considered. Due to fabrication constraints the device may use locally-varying linear birefringence and rotation of the fast axis. Any two independent phase profiles can be realized. However, the two independent phase profiles may be placed on orthogonal design polarizations and the output polarization is the complex conjugate of the input polarization (e.g., the handedness is flipped after passing through the device).

For an arbitrary input polarization and its orthogonal counterpart, these polarizations in the linear polarization basis $\{|H\rangle, |V\rangle\}$ can be represented as $$|\lambda^+\rangle = \begin{bmatrix} \cos\chi \\ e^{i\delta}\sin\chi \end{bmatrix} \quad |\lambda^-\rangle = \begin{bmatrix} -\sin\chi \\ e^{i\delta}\cos\chi \end{bmatrix} \quad (10)$$

where $\chi$ and $\delta$ control the ellipticity of the beam. Taking these general polarization states and two independent azimuthal phase factors, $m\phi$ and $n\phi$ as the desired phase profiles, a single Jones matrix can be used to carry out the following two transformations $$J|\lambda^+\rangle = e^{im\phi}|(\lambda^+)^*\rangle \quad (11)$$
$$J|\lambda^-\rangle = e^{in\phi}|(\lambda^-)^*\rangle. \quad (12)$$

Upon matrix inversion, the form of J is:

$$J(\phi) = \begin{bmatrix} e^{im\phi}(\cos\chi)^* & e^{in\phi}(-\sin\chi)^* \\ e^{im\phi}(\sin\chi e^{i\delta})^* & e^{in\phi}(\cos\chi e^{i\delta})^* \end{bmatrix} \begin{bmatrix} \cos\chi & -\sin\chi \\ \sin\chi e^{i\delta} & \cos\chi e^{i\delta} \end{bmatrix}^{-1}. \quad (13)$$

Suppressing the $\phi$-dependence for brevity (here and below) and carrying out the matrix multiplication gives $$J = e^{-i\delta}\begin{bmatrix} e^{i\delta}(e^{im\phi}\cos^2\chi + e^{in\phi}\sin^2\chi) & \frac{\sin 2\chi}{2}(e^{im\phi} - e^{in\phi}) \\ \frac{\sin 2\chi}{2}(e^{im\phi} - e^{in\phi}) & e^{-i\delta}(e^{im\phi}\sin^2\chi + e^{in\phi}\cos^2\chi) \end{bmatrix}. \quad (14)$$

After disregarding the global phase factor, this is the matrix presented in Eq. 4.

To understand how the Jones matrix for the device controls the output, the normal Jones matrix formalism can be used to relate input electric field to output polarization as $|E_{out}\rangle = J|E_{in}\rangle$ and take $|E_{in}\rangle$ to be one of the two arbitrary orthogonal polarizations above. In matrix form this is $$|E_{out}\rangle = \begin{bmatrix} e^{i\delta}(e^{im\phi}\cos^2\chi + e^{in\phi}\sin^2\chi) & \frac{\sin 2\chi}{2}(e^{im\phi} - e^{in\phi}) \\ \frac{\sin 2\chi}{2}(e^{im\phi} - e^{in\phi}) & e^{-i\delta}(e^{im\phi}\sin^2\chi + e^{in\phi}\cos^2\chi) \end{bmatrix} \begin{bmatrix} \cos\chi \\ e^{i\delta}\sin\chi \end{bmatrix} \quad (15)$$

$$= \begin{bmatrix} \cos\chi \\ e^{i(m\phi-\delta)}\sin\chi \end{bmatrix}$$

$$= e^{im\phi}\begin{bmatrix} \cos\chi \\ e^{-i\delta}\sin\chi \end{bmatrix}$$

which is $e^{im\phi}|(\lambda^+)^*\rangle$ and the device has produced the desired total angular momentum (TAM) state. The treatment for the orthogonal state is identical.

In a general case, the input polarization can be any polarization state. As a result the output state will be a superposition of the two TAM states. Consider now any input polarization $|E_{in}\rangle$ that is neither $|\lambda^+\rangle$ nor $|\lambda^-\rangle$. Since the two design polarizations are orthogonal, $\langle \lambda^+|\lambda^-\rangle =0$, the output can be decomposed in the following way $$|E_{out}\rangle = J|E_{in}\rangle \quad (16)$$
$$= [J|\lambda^+\rangle\langle\lambda^+|E_{in}\rangle + J|\lambda^-\rangle\langle\lambda^-|E_{in}\rangle]$$
$$= e^{im\phi}\langle\lambda^+|E_{in}\rangle|(\lambda^+)^*\rangle + e^{in\phi}\langle\lambda^-|E_{in}\rangle|(\lambda^-)^*\rangle$$
$$= \alpha e^{im\phi}|(\lambda^+)^*\rangle + \beta e^{in\phi}|(\lambda^-)^*\rangle$$

where the projection operator $|\lambda^+\rangle\langle\lambda^+|+|\lambda^-\rangle\langle\lambda^-|$ is inserted and in the last step it is defined $\alpha \equiv \langle\lambda^+|E_{in}\rangle$ and $\beta \equiv \langle\lambda^-|E_{in}\rangle$. The coefficients $\alpha$ and $\beta$ are complex numbers that provide both a weight and a phase to the two TAM states; this equation is identical to Eq. 5.

Since the J-plate Jones matrix in Eq. 14 is unitary, it is diagonalizable and its eigenvectors and eigenvalues can be found. Additionally, the unitarity of J guarantees that the eigenvectors are orthonormal and its eigenvalues are complex exponentials. Thus, the matrix can be decomposed into its canonical form $J=Q\Lambda Q^{-1}$ where Q is an orthonormal matrix whose columns are the eigenvectors and $\Lambda$ is a diagonal matrix whose entries are the eigenvalues of J. Since the matrix is built in the linear polarization basis, the entries in $\Lambda$ correspond to phase shifts along the x- and y-directions, $\delta_x$ and $\delta_y$. Working with a Jones matrix, the matrix Q including the eigenvectors, is simply a rotation matrix for the matrix A. In contrast to a normal linear birefringent waveplate rotated through some angle $\theta$, the values of $\delta x$, $\delta y$ and $\theta$ all depend on the spatial coordinate $\phi$.

In a general case, the eigenvalues and eigenvectors do not yield simple analytical solutions for the phase shifts and rotation angles but the solutions can be found numerically for specific values of m, n, $\chi$ and $\delta$. However, for the case where the input spin states are chosen to be circular polarizations, $\chi=\pi/4$ and $\delta=\pi/2$, but for general orbital angular momentum states m and n, simple closed form solutions can be found. In such a case, the matrix in Eq. 14 reduces to $$J = \frac{1}{2}\begin{bmatrix} e^{im\phi} + e^{in\phi} & -ie^{im\phi} + ie^{in\phi} \\ -ie^{im\phi} + ie^{in\phi} & -e^{im\phi} + -e^{in\phi} \end{bmatrix} \quad (17)$$

From which the eigenvalues can be found as $$\lambda_1 = e^{\frac{1}{2}(m+n)\phi} \quad \lambda_2 = e^{\frac{1}{2}(m+n)\phi - \pi} \quad (18)$$

and eigenvectors as $$|v_1\rangle = \begin{bmatrix} \cos\frac{1}{4}(m-n)\phi \\ \sin\frac{1}{4}(m-n)\phi \end{bmatrix} \quad |v_2\rangle = \begin{bmatrix} -\sin\frac{1}{4}(m-n)\phi \\ \cos\frac{1}{4}(m-n)\phi \end{bmatrix} \quad (19)$$

Following the decomposition outlined above, the Jones matrix for circular polarization states mapped to two arbitrary values of OAM can be expressed as $$J(r,\phi) = \begin{bmatrix} \cos\frac{1}{4}(m-n)\phi & \sin\frac{1}{4}(m-n)\phi \\ \sin\frac{1}{4}(m-n)\phi & -\cos\frac{1}{4}(m-n)\phi \end{bmatrix} \quad (20)$$

$$\begin{bmatrix} \exp\left[\frac{i}{2}(m+n)\phi\right] & 0 \\ 0 & \exp\left[\frac{i}{2}(m+n)\phi - \pi\right] \end{bmatrix}$$

$$\begin{bmatrix} \cos\frac{1}{4}(m-n)\phi & \sin\frac{1}{4}(m-n)\phi \\ \sin\frac{1}{4}(m-n)\phi & -\cos\frac{1}{4}(m-n)\phi \end{bmatrix}.$$

Since the matrix is built in the linear polarization basis, the phase shifts are $\delta x = \frac{1}{2}(m+n)\phi$ and $\delta y = \frac{1}{2}(m+n)\phi - \pi$ and the rotation angle is $\theta = \frac{1}{4}(m-n)\phi$, which are identical to Eq. 7-9.

Thus far linear polarization basis is used. In addition, if taking the matrix in Eq. 17 and change to the basis of circular polarizations $\{|R\rangle, |L\rangle\}$, insight can be gained into the action of the device. Carrying out this change of basis yields $$J_{circ} = \begin{bmatrix} 0 & e^{in\phi} \\ e^{im\phi} & 0 \end{bmatrix} \quad (21)$$

where the 'circ' subscript is added to show the circular polarization basis. The off-diagonal elements remain in the matrix and the elements are exactly the designed azimuthal phase factors. This indicates the action of the J-plate is to flip the handedness of the input and add an azimuthal phase factor, just as the more general case discussed above.

Thus far, cases that input polarization $|E_{in}\rangle$ with zero OAM, as the input state to the J-plate are considered. This case corresponds to a mapping from the Poincare sphere of SAM (polarization) to the higher order Poincare sphere (HOPS) that contains both SAM and OAM. However, the J-plate is also capable of carrying out a transfer from one HOPS to a second independent HOPS.

Consider first, that the input state to a J-plate, J2, is the output state of a previous J-plate, $J_1$. For simplicity it can be assumed that both of these devices to operate on circularly polarized eigenstates. A general output of the first device, following form above, can be written as $$|\Psi_{in}\rangle = \alpha e^{im\phi}|R\rangle + \beta e^{in\phi}|L\rangle \quad (22)$$

where again, $\alpha$ and $\beta$ are complex coefficients. Now consider $J_2$ that is designed to carry out the following transfer $$|R\rangle \rightarrow e^{i\ell\phi}|L\rangle \quad (23)$$
$$|L\rangle \rightarrow e^{ip\phi}|R\rangle.$$

that is, the action of $J_2$ is to flip the circular polarization of a state and imprint OAM values of l and p where for the most general case $m \neq n \neq l \neq p$. Passing the state in Eq. 12 through $J_2$ and using operator notation for brevity gives the output of the J-plate as $$|\Psi_{out}\rangle = J_2|\Psi_{in}\rangle = \alpha e^{im\phi}J_2|R\rangle + \beta e^{in\phi}J_2|L\rangle \quad (24)$$
$$= \alpha e^{im\phi}e^{i\ell\phi}|L\rangle + \beta e^{in\phi}e^{ip\phi}|R\rangle$$
$$= \alpha e^{i(m+\ell)\phi}|L\rangle + \beta e^{i(n+p)\phi}|R\rangle$$

Thus, since the values of l and p are also arbitrary, the action of the J-plate is to carry an arbitrary input TAM state to any new input TAM state, which now has OAM of (m+l) and (n+p). For simplicity the case discussed here is for where the all design input spin states are circular polarizations. However, this process can be generalized for elliptically-polarized design states. Thus, in addition to the case of zero OAM for the input light, the J-plate can act as a ladder in OAM. the action of the device can be represented as $$|\lambda^+\rangle|m\rangle \rightarrow |(\lambda^+)^*\rangle|m+\ell\rangle \quad (25)$$
$$|\lambda^-\rangle|n\rangle \rightarrow |(\lambda^-)^*\rangle|n+p\rangle$$

where the azimuthal phase factor gives the field OAM and written this OAM explicitly as a state. When extending this treatment to the case of general elliptically-polarized eigenstates, however, in order for the J-plate to simply add to the OAM of the input state, the polarization basis of the input state is specified to be identical to the eigenstates of the J-plate it is passing through. That is, the input state must be of the form $|\Psi_{in}\rangle = \alpha e^{im\phi}|\lambda^+\rangle + \beta e^{in\phi}|\lambda^-\rangle$. Because the J-plate can be designed to perform SOC with any eigen-polarization, whereas comparative devices operate on input circular polarizations, multiple cascaded J-plates can be used with unique eigen-polarizations which can lead to new functionalities.

Specific Case of the q-Plate

The design principle disclosed here for arbitrary SOC is a more general case than the specific geometric phase design, q-plate. As such, if the target SOC parameters are set to be equivalent to the q-plate design, the more general case of the J-plate may collapse into the specific case of the q-plate.

For the q-plate the two values of OAM are specified to be conjugates, m=|l| and n=−|l|, and the design polarizations are specified to be orthogonal circular polarizations, implying that $\chi=\pi/4$ and $\delta=\pi/2$. For such a case, the eigenpolarizations are left- and right-circular polarizations $$|\lambda^+\rangle = |R\rangle = \frac{1}{\sqrt{2}}\begin{bmatrix}1\\i\end{bmatrix} \qquad (26)$$

$$|\lambda^-\rangle = |L\rangle = \frac{1}{\sqrt{2}}\begin{bmatrix}1\\-i\end{bmatrix} \qquad (27)$$

Entering these design polarizations into the matrix in Eq. 13 yields the device matrix $$J = \begin{bmatrix}\cos\ell\phi & \sin\ell\phi \\ \sin\ell\phi & -\cos\ell\phi\end{bmatrix}. \qquad (28)$$

The eigenvalues of this matrix provide the phase shift, while the eigenvectors provide the rotation angle of each element at each point (r, $\phi$). Upon carrying out this analysis, the q-plate device matrix is decomposed into a diagonal matrix whose entries are the eigenvalues and rotation matrices whose columns are the eigenvectors, yielding $$J = \begin{bmatrix}\cos\frac{\ell}{2}\phi & \sin\frac{\ell}{2}\phi \\ \sin\frac{\ell}{2}\phi & -\cos\frac{\ell}{2}\phi\end{bmatrix}\begin{bmatrix}-1 & 0 \\ 0 & 1\end{bmatrix}\begin{bmatrix}\cos\frac{\ell}{2}\phi & \sin\frac{\ell}{2}\phi \\ \sin\frac{\ell}{2}\phi & -\cos\frac{\ell}{2}\phi\end{bmatrix}. \qquad (29)$$

Thus, for the case of conjugate angular momentum states and orthogonal circular polarization design states, the phase delays along the x- and y-directions are $\delta x=-\delta y=1$. These phase delays are constants, e.g., independent of the azimuthal coordinate $\phi$, and represent a half wave plate. Similarly based on the rotation angle, each element, which is shown to be a half wave plate, is rotated about its fast axis according to the equation $\theta=l\phi/2$. Following the Eq 23 that l=2q, the rotation angle is given by $\theta(r, \phi)=q\phi$. This result is identical to the treatment of the q-plate, up to an arbitrary constant offset, and thus this specific case of SOC is covered in the more general form disclosed here.

Derivation of Output from Rotating QWP

The path taken on the Poincare sphere and the general output state that is obtained for FIG. 3 can be derived in the following way. Beginning with the output from a laser, which is horizontally polarized, the beam passes through a QWP with a varying fast axis angle, $\beta$, followed by the J-plate that has been designed for the mapping of the form of Eq. 13. The output of the two cascaded elements can be found as $$|E_{out}\rangle = JM(\beta)|E_{in}\rangle \qquad (30)$$

where M($\beta$) is the standard Jones matrix for a QWP with rotated fast axis $$M(\beta) = \begin{bmatrix}\cos^2(\beta) + i\sin^2(\beta) & (1-i)\cos(\beta)\sin(\beta) \\ (1-i)\cos(\beta)\sin(\beta) & i\cos^2(\beta) + \sin^2(\beta)\end{bmatrix} \qquad (31)$$

J is the Jones matrix given in Eq. 17 and $|E_{in}\rangle=|H\rangle=[1,0]'$.

Carrying out this matrix multiplication and changing to the left and right circular polarization basis, this result can be decomposed to give the general output. After applying trigonometric identities, this process yields the output as $$|\Psi(\beta)\rangle = \sin\left(\frac{\pi}{4}-\beta\right)|L\rangle|m\rangle + e^{i2d}\cos\left(\frac{\pi}{4}-\beta\right)|R\rangle|n\rangle \qquad (32)$$

Checking this equation for two cases where the angle of the QWP are $\beta=+45$ degrees and $\beta=-45$ degrees, which correspond to left and right circular polarized input states to the J-plate, the outputs are pure states of $|\Psi(+45°)\rangle=|R\rangle|m\rangle$ and $|\Psi(-45°)\rangle=|L\rangle|n\rangle$. All other values of B lead to a superposition of the two TAM state with weights and phases determined by Eq. 32.

Simulation

The phase shifts, $\delta x$ and $\delta y$ for the linearly birefringent metasurface elements are determined using finite difference time domain software (e.g., FDTD, Lumerical Inc). A linearly polarized plane wave with $\lambda=532$ nm is incident on an individual metasurface element with a fixed height of 600 nm and a refractive index of about 2.42 (the value for amorphous TiO$_2$ at this wavelength). The phase shift, and transmission from this element is recorded as the width of the element is varied. The range of widths allow the library of elements to achieve any phase shift from [0, 2$\pi$] is searched, and a range of widths that provide a similar high transmission efficiency is chosen.

Fabrication

The devices are fabricated on fused silica substrates. The substrates were spun coated with undiluted positive electron beam resist (EBR) (e.g., ZEP-520A; Zeon Chemicals). The resist is spun at about 1,750 rpm to achieve the desired resist thickness of about 600 nm. The samples are baked at 180 C for 5 minutes. Subsequently, the samples are coated with ESPACER (Showa Denko K.K.), a conductive polymer, to avoid charging effects during the writing process. The patterns were exposed using an accelerating voltage of 125 kV (ELS-F125; Elionix Inc.), with a dose area of 880 μC/cm2 and developed in oXylene (Sigma Aldrich) for 40 s under gentle agitation. The TiO$_2$ is deposited directly onto the exposed EBR using atomic layer deposition (Savannah; Cambridge Nanotech). A standard two-pulse system of water and tetrakis(dimethylamido)titanium(IV) precursor was used with a 0.2 s water pulse followed by a 7 s delay and a 0.4 s TDMAT pulse followed by a 10 s delay. The system was left under continuous 20 cm$^3$/min flow of N2 carrier gas and was maintained at 90 degrees Celsius throughout the process. This led to an overall deposition rate of 0.7 nm per cycle. This process ultimately leaves a blanket film of TiO$_2$ covering the entire device which is removed to expose the individual metasurface units. This film is removed using reactive ion etching (Unaxis inductively coupled plasma) using a mixture of Cl$_2$ and BCl$_3$ gas (3 and 8 cm$^3$/min, respectively) at a pressure of 4 mTorr, substrate bias of 150 V, and ICP power of 400 W. Etch rates were typically between 1.3 nm/s and 1.6 nm/s. After processing was complete, the resist is removed by placing the samples in Remover PG for 24 hours, followed by a final clean in 2:1, sulfuric acid: H$_2$O$_2$.

Measurement

In order to fully characterize a vortex beams, both the intensity distribution and the phase fronts of the field are measured. As such a Mach-Zehnder interferometer is used.

In this configuration, the horizontally-polarized source beam (a CW solid-state laser emitting at 532 nm with power of 4 mW) is split in two beams by means of a 50/50 beam splitter (BS). Half of the light is sent through the 'test arm' that contains the device and the other half of the light is sent through the 'reference arm'.

For the case of FIGS. 2 and 3, the two output states of the device are designed to propagate collinearly. In the test arm, a halfwave plate (HWP) and quarter wave plate (QWP) are placed before the J-plate. For the case where the input to the device in FIG. 2 is one of the circularly polarized eigenstates the HWP is removed and the horizontally-polarized laser beam is passed through QWP1. The fast axis of QWP1 is oriented at +45 degrees to produce a left- or right-circularly polarized beam incident on the J-plate. At the output, the vortex beam then passes through QWP2, which has its fast axis oriented at 90 degrees with respect to QWP1 and the LP is in cross-polarization with respect to the laser. The purpose of QWP2 and LP are to filter out any light that is either unconverted by the J-plate or light that has not been incident on the device (the beam diameter is larger than the device aperture and the substrate is transparent). Thus after QWP2 and LP, the OAM beam remains. In the reference arm, the beam passes through a HWP that rotates the polarization of the laser beam from horizontal to vertical and it then is sent to a 5× beam expander (BE). The reference beam and the OAM beam are then recombined via BS2 and imaged on a camera. The interference of the two beams, expanded reference beam and OAM beam, results in the measured characteristic spiral interference pattern (as seen in FIGS. 2D(i) and (vi)). A beam block (BB) is inserted into the reference arm and thus eliminate the interference, to measure the intensity profile of the beam exiting the J-plate. profile of the beam exiting the J-plate.

To create the equal superpositions of the two designed states, QWP1 and QWP2 are removed and the HWP is inserted into the test arm. Thus by passing the linearly-polarized laser through the HWP and varying the angle of the fast axis of the HWP, the angle of the linear polarization incident on the device is changed with respect to the horizontal axis. Again, the BB is inserted or removed in order to collect the intensity images or the interference images, respectively. This configuration is used to collect the images in FIGS. 2B and D (ii-v). To create a continual evolution from one pole of the HOPS to the opposite pole, as in FIG. 3, the relative angle between the fast axis of QWP1 and QWP2 is set to about 90 degrees and then the angle of each fast axis is varied in steps of about 10 degrees. The intensity and interference images are collected as above.

Figure 5:
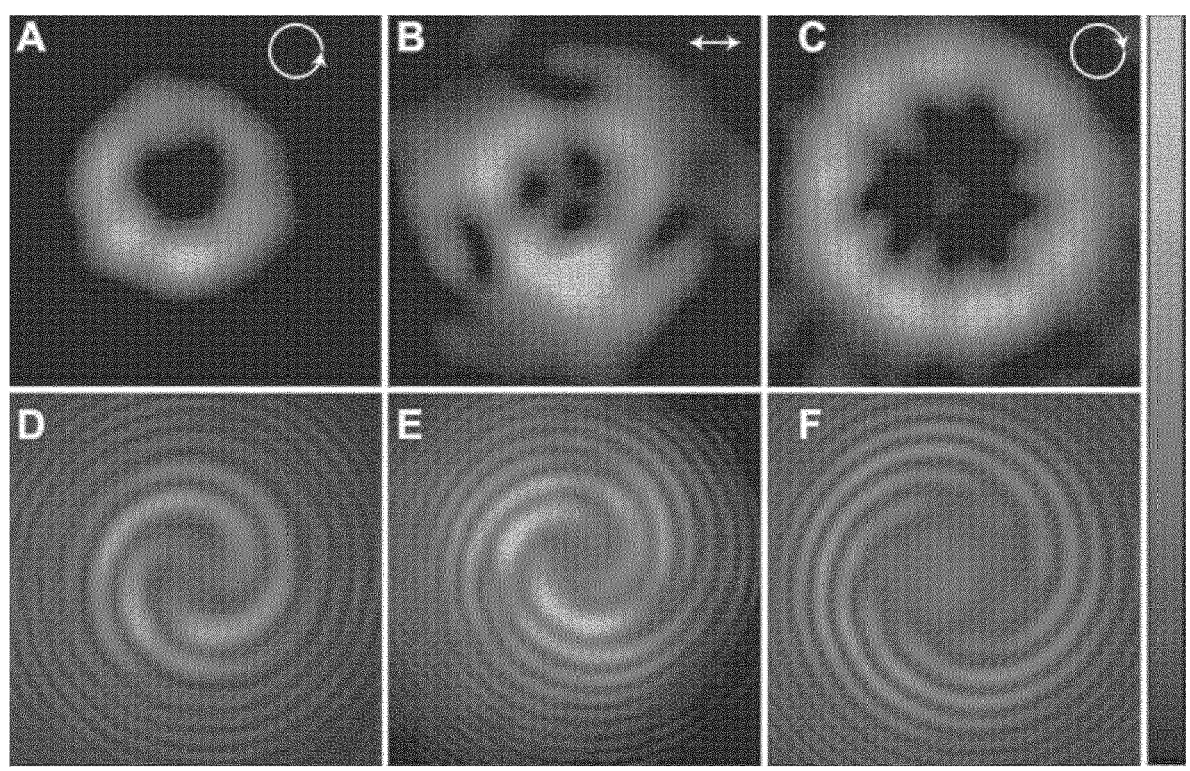
FIG. 5 shows demonstration of generalized spin-orbit-conversion. (A) Schematic diagram of the device that maps elliptically-polarized input states to two independent values of OAM. An input beam with polarization state $|E_{in}\rangle$ is incident on the J-plate and is mapped to a superposition of OAM states where the weights are given as a projection of the input polarization onto the two designed eigen-polarizations. An additional constant phase gradient is added to the device so that the two output states are also spatially separated by an angle of positive or negative 10 degrees. (B) Stokes polarimetry to measure the eigen-polarization. The beam intensities are shown for the two OAM states, $|+4\rangle$ and $|-3\rangle$, and the input polarizations for each image is shown below. (C,D) Interference pattern for the $|+4\rangle$ and $|-3\rangle$ states collected at angles of positive or negative 10 degrees from the z-axis. The number of arms in the corresponding spiral interference patterns are 4 (C) and 3 (D), indicating that the output beams have the designed values of OAM. The sense of rotation of the spirals, however, is opposite for (C) and (D) due to the opposite handedness of the two states. (E) Designed and measured polarization of the output states on the HOPS. (F,G) The designed and measured polarization ellipses for the input states $|\lambda+\rangle$ and $|\lambda-\rangle$, respectively.

For the case of the device in FIG. 5 which exemplifies the most general case of SOC, because the device is designed to separate the two output states at angles of ±10 degrees by the addition of a blazed grating phase profile, there is no need to filter out unconverted light. QWP1 and the HWP allow varying the input polarization to the device. Two additional mirrors are inserted after the device and a BB is placed in one of the output beam paths. The two mirrors direct the output OAM mode to BS2 where again it is sent to a camera to collect the intensity or interference image. The output power at each angle is measured as the input polarization is varied (see discussion below). An optical power meter can be placed in each of the two beam paths to measure the output power.

Intensity Calculation for Superpositions of Laguerre-Gaussian Beams

In addition to considering the azimuthal phase dependence of the OAM beam, e.g., $e^{il\phi}$, at a fixed propagation plane, z', these beams will have different spatial distribution of their amplitudes for different values angular momentum l. Laguerre-Gaussian (LG) modes, which are solutions to the paraxial wave equation in cylindrical coordinates, carry an azimuthal phase dependence and therefore OAM. The amplitudes of these LG beams are given by $$u_{p,\ell}(r, \phi, z) = \sqrt{\frac{2p!}{\pi(p+|\ell|)}} \frac{1}{w(z)} \left(\frac{r\sqrt{2}}{w(z)}\right)^{|\ell|} L_p^{|\ell|}\left(\frac{2r^2}{w(z)^2}\right) \quad (34)$$

$$\exp\left(\frac{-r^2}{w(z)^2}\right)\exp\left(\frac{-ikr^2}{2R(z)}\right)\exp\left[-i(|\ell|+1)\arctan\left(\frac{z}{z_R}\right)\right]\exp(i\ell\phi)$$

In general such LG beams can have both a radial and an azimuthal index, given by p and l, respectively. However, only l alters the OAM content of the beam so considering only beams with p=0. In such a case, the amplitude reduces to $$u_{0,\ell}(r, \phi, z) = \sqrt{\frac{1}{\pi|\ell|}} \frac{1}{w(z)} \left(\frac{r\sqrt{2}}{w(z)}\right)^{|\ell|} L_0^{|\ell|}\left(\frac{2r^2}{w(z)^2}\right) \quad (34)$$

$$\exp\left(\frac{-r^2}{w(z)^2}\right)\exp\left(\frac{-ikr^2}{2R(z)}\right)\exp\left[-i(|\ell|+1)\arctan\left(\frac{z}{z_R}\right)\right]\exp(i\ell\phi)$$

Whenever the input polarization to the J-plate is any polarization that is not one of the eigen-polarizations, the device forms a superposition of the form Eq. 16. This amounts to a superposition of two OAM modes with amplitudes given by Eq. 34. The relative phase shift and weights of these two OAM modes are then determined by the complex coefficients α and β, which are determined by the projection of the input polarization onto the two eigen-polarizations of the device (again as shown in Eq. 34). Taking all of these factors together, the calculated plots of intensity shown in FIG. 2C(i-vi) are produced using the following equation $$\langle \Psi | \Psi \rangle = |\alpha u_{0,m}(r, \phi, z) + \beta u_{0,n}(r, \phi, z)|^2 \quad (35)$$

where m and n are the designed OAM values of the device. To calculate the phase plots in FIGS. 2E(i-vi), the argument of the superposition is taken.

Device Design for Mapping from General Input Polarization

Figure 10:
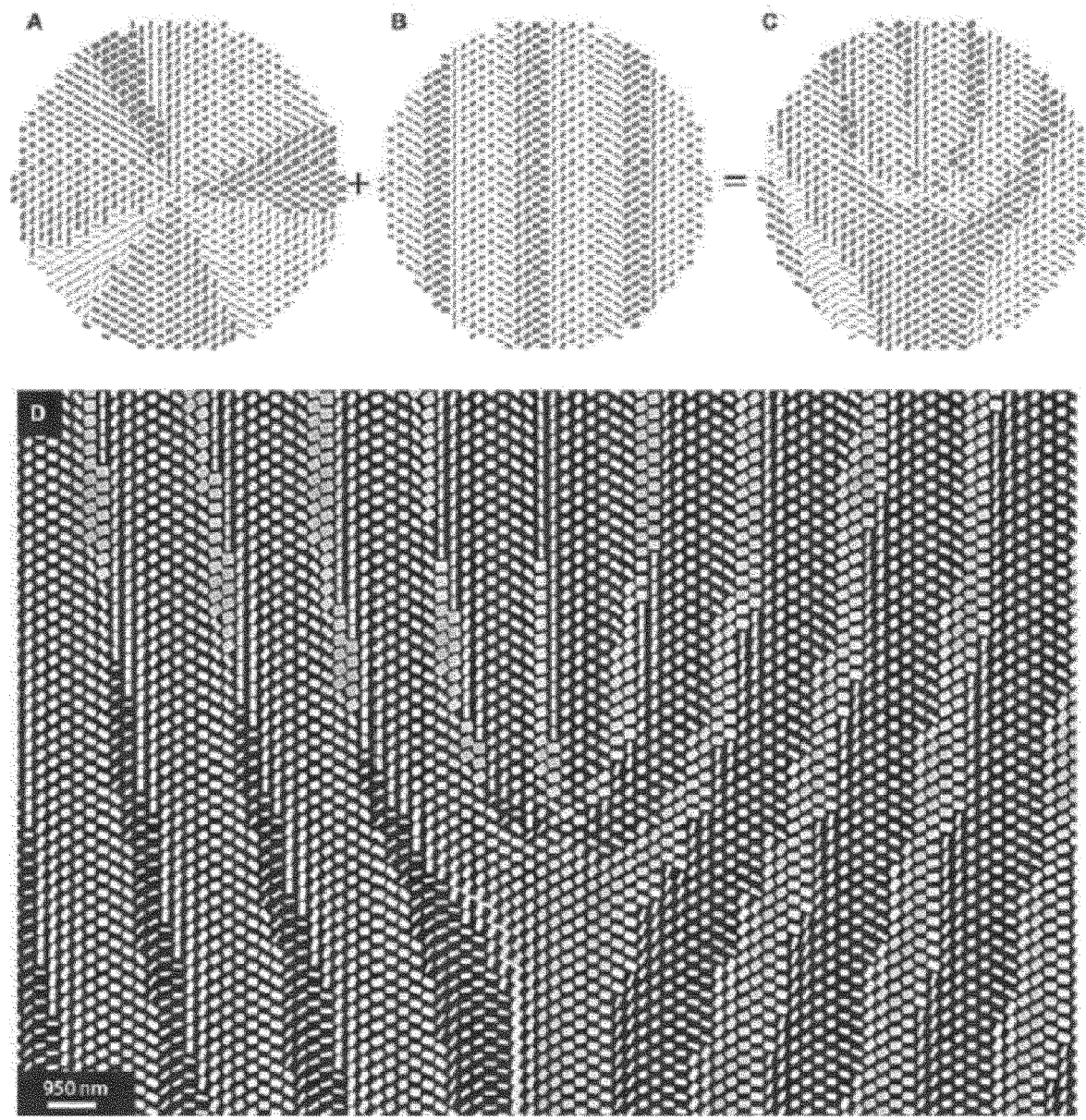
FIG. 10 shows generalized design for elliptical polarization spin-orbit conversion (SOC) and mode separation. (A) Device design for mapping from elliptically polarized inputs with $\chi=\pi/6$ and $\delta=3\pi/10$. This device design would produce both output beams co-linearly. (B) Device design for a blazed grating that deflects the two beams produced by the device in (A) to positive or negative 10 degrees away from the input beam optical axis. (C) Sum of the designs in (A) and (B) which is the device used in FIG. 4. (D). Scanning electron microscope image of the fabricated device.

The device presented in FIG. 4, the most general demonstration of SOC not only imparts unique OAM onto two incident elliptically polarized beams but also adds an additional blazed grating to both of the beams in order to separate the outputs. To design this device, as discussed above, it is to solve for the eigenvectors and eigenvalues of the device matrix in Eq. 14 for the specific numerical values of $\chi=\pi/3$, $\delta=3\pi/10$, m=−3 and n=+4. The device design is made up of a sum of two different devices, as shown in FIG. 10. FIG. 10A shows the device design that would take the two input elliptical polarization eigenstates and map them to the two output TAM beams propagating co-linearly. FIG. 10B shows a device design which acts as blazed grating for two elliptical polarizations. FIG. 10C shows the sum of the previous two devices which is ultimately the fabricated device for the demonstration in FIG. 4 and FIG. 10D shows an SEM image of the fabricated device. Adding a blazed grating profile to the two TAM states produces a device that resembles a forked hologram, which is used to produce OAM beams. However, a difference between the device in FIG. 10 and a conventional forked hologram is that the device in FIG. 10 has spatially varying birefringence and orientation of the birefringence axis. Thus the device presented here can be an instance of a forked hologram where the SAM is mapped to OAM and the OAM exiting the device on the two blazing angles can be designed to be any value. This separation of the beam allows performing polarimetry on the device and experimentally confirming that the eigen-polarizations of the device are elliptically-polarized.

Stokes Polarimetry for Measuring Input Device Polarizations

The present disclosure describes a general form of spin-orbit coupling (SOC), one that is not bound by the comparative device constraint of equal-and-opposite topological charges ±q for each circular polarization. To that end, using the formalism disclosed, a J-plate can create vortex beams of arbitrary topological charge for a basis of arbitrarily chosen elliptical polarization states.

In order to demonstrate that the device as-fabricated performs the desired function, two facts may be confirmed experimentally: First, the vortex beams created are of the desired, designed topological charges m and n. Second, the polarization states producing pure vortex beams match the desired design elliptical polarization states.

For ease of verification, the vortex beam phase profiles were blazed at equal and opposite angles so that the vortex beams would appear on different diffraction orders. This way, each of the polarization channels may be examined independently at separate locations in space, without one acting as a contaminating background for the other.

The first item above can be verified. Visual inspection of the beam on each diffraction order and its associated interference pattern readily reveals its topological charge.

The second point is somewhat more subtle. Suppose that the design elliptical polarization states are given by orthogonal Jones vectors $|\lambda^+\rangle$ and $|\lambda^-\rangle$. If a beam with a polarization state given by normalized Jones vector $|\ell\rangle$ and power $P_0$ is incident on the device, ideally the order associated with $|\lambda^+\rangle$ will have a power $P^+ = P_0 |\langle \ell | \lambda^+\rangle|^2$ and similarly the order associated with $|\lambda^-\rangle$ will have a power $P^- = P_0 |\langle \ell | \lambda^-\rangle|^2$ (assuming a lossless device). That is, when one design polarization is incident, the power on one order should be maximized and the other extinguished, and vice versa.

These so-called maximally preferred polarization states are determined for each order. Consider each diffraction order as having a characteristic polarization of its own, and denote these by Stokes vectors where $\vec{S}^\pm = [S_0^\pm S_1^\pm S_2^\pm S_3^\pm]^T$ where + and − refer to the two diffraction orders. To determine $\vec{S}^+$ and $\vec{S}^-$, each has its own degree of polarization (DOP) given by $$p = \frac{\sqrt{S_1^2 + S_2^2 + S_3^2}}{S_0}$$

and a state of polarization (SOP) given by $\{S_1, S_2, S_3\}$. For each order, p=1 and the SOP matches that of the design Jones vector, $|\lambda^\pm\rangle$. Note that the Jones vector and the SOP (pictorially represented on the Poincaré sphere) are interchangeable representations of the polarization ellipse.

In order to experimentally determine $\vec{S}^\pm$, a polarimetric measurement can be performed. The measurement can rely on the Stokes representation as it is naturally tailored to such a measurement, given that the Stokes vector being based on intensities is experimentally measurable.

The measurement works as follows: illuminating the device with six different test polarizations which are easy to prepare with a polarizer and quarter-wave plate. These are $|H\rangle$, $|V\rangle$, $|45°\rangle$, $|135°\rangle$, $|R\rangle$, and $|L\rangle$. For each polarization, the power of the illuminating beam is recorded (the laser has a strong preferred polarization). Denote this by $P_{inc,|i\rangle}$ where $|i\rangle$ is the incident polarization state. For each test polarization, the power being directed into each diffraction order is recorded and denote this by $P_{|i\rangle}^\pm$ for each diffraction order + and −. Then for each order:

$$\begin{bmatrix} P_{inc,|H\rangle} & P_{inc,|H\rangle} & 0 & 0 \\ P_{inc,|V\rangle} & -P_{inc,|V\rangle} & 0 & 0 \\ P_{inc,|45°\rangle} & 0 & P_{inc,|45°\rangle} & 0 \\ P_{inc,|135°\rangle} & 0 & -P_{inc,|135°\rangle} & 0 \\ P_{inc,|R\rangle} & 0 & 0 & P_{inc,|R\rangle} \\ P_{inc,|L\rangle} & 0 & 0 & -P_{inc,|L\rangle} \end{bmatrix} \begin{bmatrix} S_0^\pm \\ S_1^\pm \\ S_2^\pm \\ S_3^\pm \end{bmatrix} = \begin{bmatrix} P_{|H\rangle}^\pm \\ P_{|V\rangle}^\pm \\ P_{|45°\rangle}^\pm \\ P_{|135°\rangle}^\pm \\ P_{|R\rangle}^\pm \\ P_{|L\rangle}^\pm \end{bmatrix} \quad (36)$$

or, in short form:

$$A\vec{S}^\pm = \vec{P}^\pm \quad (37)$$

This equation can be understood as follows: each row of the matrix A is the power-weighted Stokes vector of the test polarization. Each entry in the measured power vector $\vec{P}^\pm$ is then the inner product of the incident test polarization with the characteristic Stokes vector $\vec{S}^\pm$. $\vec{S}^\pm$ is determined by successive projection onto known polarization states.

The system is overdetermined (A is 6×4), so the system is solved in the least-squares sense. That is, $$\vec{S}^\pm = (A^T A)^{-1} A^T \vec{P}^\pm \quad (38)$$

the SOPs obtained from $\vec{S}^\pm$ measured in this way are compared against the design states, showing reasonably close agreement.

It should be noted that measuring the polarization states $\vec{S}^\pm$ for the two diffraction orders is not akin to a measurement of the polarization state of light on this diffraction order. Indeed, $\vec{S}^\pm$ are the characteristic polarization states to which power directed into the order is selective, not the light's polarization state itself. In this way, $\vec{S}^\pm$ can be viewed as the eigen-polarizations of the diffraction orders.

Versatile Total Angular Momentum Generation Using Cascaded J-Plates

There are many methods to generate OAM beam in free space and surface wave and many application have been demonstrated. Q-plate, a spin-orbital momentum generator, is one of the methods used to generate OAM beams. Q-plate can be realized using liquid crystals, polymers, etc, but the relative large pixel size limits the beam generation quality and efficiency. The spin-orbital conversion has been demonstrated in dielectric metasurfaces that achieve sub-wavelength pixel size in the visible. It can generate conjugated OAM but the spin of input beam is converted to output with opposite spin as well. There are two restrictions in Q-plate. First, it is in circular polarization basis. Secondly, the output OAM states are constrained to be conjugate values for the opposite polarizations. Independent phase control design method in two arbitrary orthogonal polarizations can overcome these restrictions. It is demonstrated non-conjugated OAM beams and hologram images imparted in circular polarization basis. The first restriction was overcome as well as the second that the device, J-plate, can impart two arbitrary different helical phase fronts in two arbitrary orthogonal spin states. J-plate refers to the variable denoting the photon's TAM. However, there is still a restriction: The output states are the same states as the input states with flipped handedness. The output polarization states are the conjugate of the input states if a single layer of metasurface elements with linear structural birefringence.

According to at least some embodiments, when J-plates are cascaded, they can generate for versatile non-separable and separable TAM states and the output polarization states are not limited to be the conjugate of the input states. Cascaded J-plates are also demonstrated to produce vector vortex beams and complex structured light, providing new ways to control TAM states of light.

Figure 11:
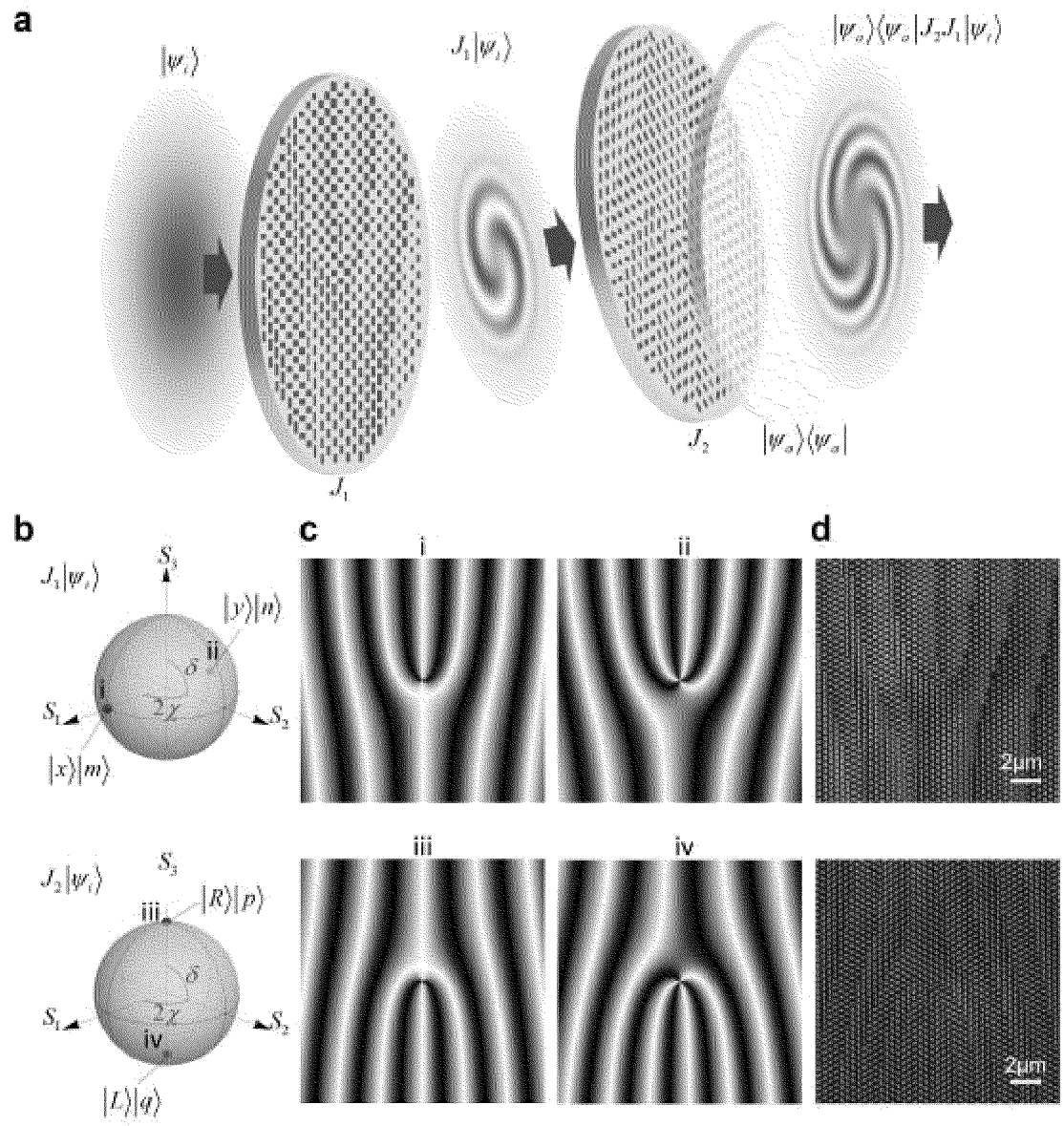
FIG. 11 shows a generation of versatile total angular momentum (TAM) by using cascaded J-plates. The bracket notation is used for describing how the J-plates and analyzer operates on incident state. Versatile TAM states can be generated by selection of incident state, analyzer, the order of J-plates, etc. (b) Two higher order Poincare sphere (HOPS) respectively representing the functionality of J-plates, J1 (top) and J2 (bottom). Circles i-iv mark the direct product TAM states that J1 and J2 can carry out: $|x\rangle|m\rangle$ and $|y\rangle|n\rangle$ for J1 (top) and $|R\rangle|p\rangle$ and $|L\rangle|q\rangle$ for J2 (bottom). (c) Phase profile of the four states. The phase is from two terms, an azimuthal phase factor and a grating phase along x-axis for tilt output. The parameters of the terms are OAM quantum number and tilt angle of output beam. (d) SEM images of J1 and J2 samples.

This disclosure describes cascaded two metasurfaces that can generate versatile TAM states without the restriction (output states are the same as input states with flipped handedness). FIG. 11 shows the concept of the cascaded two J-plates system. When the incidence state $|\Psi\rangle$ passes through the first J-plate ($J_1$), $J_1|\Psi\rangle$ results in two possible pure TAM states or their superposition. It is assumed the second J-plate ($J_2$) has different eigen polarization state with that of the first J-plate. After passing through the second J-plate, $J_2J_1|\Psi\rangle$ results in four possible design TAM states or their combination. The analyzer can be a single polarizer to filter out linear polarization state or a set of quarter wave plate and a polarizer to filter out circular or elliptical polarization. By selecting the polarization state of incidence $|\Psi\rangle$ or analyzer $|\Psi_\alpha\rangle\langle\Psi_\alpha|$, the output states can be direct product (non-separable) OAM states, superposition of two OAM states, superposition of four OAM states, vector vortex beam, and other symmetric rotation patterns form different phase shift in the superpositions. Beside, these OAM states can be generated with different spin state (polarization) by changing the order of J-plates. It is because the output polarization state is determined by the eigen polarization states of the last J-plate. The different selections provide cascaded J-plates more degrees of freedom to produce versatile TAM states and complex structure light.

J-plate is an arbitrary spin-to-orbital angular momentum converter that can transfer two orthogonal polarized states ($|\lambda^+\rangle$ and $|\lambda^-\rangle$) to their conjugate orthogonal polarized states ($|(\lambda^+)^*\rangle$ and $|(\lambda^-)^*\rangle$) with different OAM states, such as $|m\rangle$ and $|n\rangle$. The notation can be written as below.

$$J|\lambda^+\rangle|\ell\rangle = |(\lambda^+)^*\rangle|\ell+m\rangle,$$
$$J|\lambda^-\rangle|\ell\rangle = |(\lambda^-)^*\rangle|\ell+n\rangle.$$

The eigen-polarization states (or basis, two arbitrary orthogonal polarization states) can be written in a general form:

$$|\lambda^+\rangle = \begin{bmatrix} \cos\chi \\ e^{i\delta}\sin\chi \end{bmatrix}; |\lambda^-\rangle = \begin{bmatrix} -\sin\chi \\ e^{i\delta}\cos\chi \end{bmatrix},$$

where $\chi$ and $\delta$ are the orientation angle and twice ellipticity angle. Twice of orientation angle ($\chi$) and twice ellipticity angle $\delta$ are representing the azimuthal angle along equator and polar angle along longitude on the Poincare sphere.

To decouple of the conjugate relation between the input and output states, two J-plates are designed for different basis. The first J-plate ($J_1$) is designed in linear polarization basis, where $\chi=0$, $\delta=0$. and the two eigen-polarization states are (x) and $|y\rangle$. The second J-plate ($J_2$) is designed in circular polarization basis, where $\chi=\pi/4$, $\delta=\pi/2$, and the two operation orthogonal polarization states are $|L\rangle$ and $|R\rangle$. They perform transformation like this:

$$J_1|x\rangle|\ell\rangle = |x\rangle|\ell+m\rangle,$$
$$J_1|y\rangle|\ell\rangle = |y\rangle|\ell+n\rangle,$$
$$J_2|L\rangle|\ell\rangle = |R\rangle|\ell+p\rangle,$$
$$J_2|R\rangle|\ell\rangle = |L\rangle|\ell+q\rangle,$$

where parameters m, n, p, and q are OAM quantum numbers. To satisfy such transformation, single layer metasurface with linear structural birefringence are used. FIG. 11(b) shows the higher-order Poincare sphere (HOPS) representing all possible TAM produced by $J_1$ (top) and $J_2$ (bottom). Three axis S1, S2, and S3 are corresponding to polarization states $|x\rangle$, $|45°\rangle$, and $|R\rangle$ in positive direction and $|y\rangle$, $|135°\rangle$, and $|L\rangle$ in negative direction. On the PS, the azimuthal angle and polar angle represent twice orientation angle ($2\chi$) and twice ellipticity angle ($\delta$) of any polarization state. The circles mark the direct product TAM states that each J-plate converts. To satisfy above four equations, the required matrix for $J_1$ and $J_2$ versus azimuthal angle on the metasurface plane $\theta$ are:

$$J_1(\phi) = \begin{bmatrix} e^{im\phi} & 0 \\ 0 & e^{in\phi} \end{bmatrix},$$

$$J_2(\phi) = \frac{1}{2}\begin{bmatrix} -(e^{ip\phi}+e^{iq\phi}) & i(e^{ip\phi}-e^{iq\phi}) \\ i(e^{ip\phi}-e^{iq\phi}) & (e^{ip\phi}-e^{iq\phi}) \end{bmatrix}.$$

The efficiency of metasurface elements that J-plates include can be improved. The non-design term may be weak for single metasurface case. But it can be emphasized in cascaded metasurfaces case since the whole efficiency is multiplied by efficiency of each metasurface. The intensity of non-design term increases if light passes through more metasurfaces, resulting in lower contrast of measured TAM states. To overcome this situation, a grating phase term exp(ikx sin θ) in design can be added to separate non-design term, in such a way that the TAM state goes to a tilt angle (and non-design term keeps on zero order). Set θ=10 for $J_1$ and −10 for $J_2$, respectively. In this way, the output beam can propagate to z-direction as well and the non-design term can be block during the measurement. In the experimental demonstration, set m=2, n=3, p=2, and q=4 FIG. 11c shows the required phase profiles of the four pure TAM states as a function of position. The phase shift ($\phi_l$ and $\phi_s$) and orientation angles ($\theta$) can be achieved as a function of position.

$$J(x,y) = \begin{bmatrix} e^{i\phi^+(x,y)}(\lambda_1^+)^* & e^{i\phi^-(x,y)}(\lambda_1^-)^* \\ e^{i\phi^+(x,y)}(\lambda_2^+)^* & e^{i\phi^-(x,y)}(\lambda_2^-)^* \end{bmatrix} \begin{bmatrix} (\lambda_1^+) & (\lambda_1^-) \\ (\lambda_2^+) & (\lambda_2^-) \end{bmatrix}^{-1} =$$

$$R[-\theta(x,y)]\begin{bmatrix} e^{i\phi_l(x,y)} & 0 \\ 0 & e^{i\phi_x(x,y)} \end{bmatrix} R[\theta(x,y)]$$

The designed J-plates are realized by sampling 600-nm-height TiO$_2$ nanofin structures on a glass substrate. Different length and width of the structures results in the different phase shift along the long and short axis ($\phi_l$ and $\phi_s$). The function of rotation matrix $R[\theta(x,y)]$ is to rotate the global coordinate to each local coordinate. FIG. 11(d) shows the scanning electron micrographs (SEMs) of $J_1$ (top) and $J_2$ (bottom). Since $J_1$ is linear basis schematic, the phase shift from the nanofins are based on propagation phase, resulting in several different size of rectangular structures without any rotation ($\theta$=0). In contrast, the phase shift from $J_2$ are based on combined propagation and geometric (PB) phase. $J_2$ includes several different size of rectangular structures with different rotation.

Figure 12:
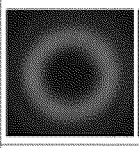
FIG. 12 shows non-separable TAM states generated by the cascaded J-plates. (a) Table of the generated non-separable TAM states with measured intensity profile (right) and interferogram (left) obtained with another reference beam. The corresponding incidence state and the analyzer state are depend on the eigen-polarization state of J1 and J2. (b) Table of the others generated non-separable TAM states while changing the order of J1 and J2. The corresponding incidence states is $|L\rangle$ or $|R\rangle$ and analyzer state is $|x\rangle\langle x|$ or $|y\rangle\langle y|$ in this case.

To characterized the TAM states of a beam, both intensity and phase distribution are measured. Intensity profile of a beam can be measured directly by projecting on camera, while the phase profile can be characterize using a Mach-Zehnder configuration. FIG. 12 shows a case of all possible non-separable TAM states that cascaded J-plates can generated. FIG. 12a is for the case of $J_2J_1|\Psi\rangle$, where the light passes through $J_2$ after $J_1$. The images in table are measured intensity profile of TAM states (right) and their interference pattern (left). Top row of the table shows the selection of incidence polarization states $|x\rangle$ or $|y\rangle$ ) that rely on the eigen-polarization state of the first J-plate $J_1$. With similar reason, left column of the table shows the selection of analyzer polarization states ($|R\rangle\langle R|$ or $|L\rangle\langle L|$) and the function of the second J-plate $J_2$$. Once the light with zero OAM passes through cascaded J-plates, the OAM of output beam increases (m+p)$\hbar$, (m+q)$\hbar$, (n+p)$\hbar$, and (n+q)$\hbar$, depending on the selection of incidence polarization and analyzer polarization. The measured output states show annular intensity profile because of the phase singularity on the beam axis, resulting in the convergence of the spiral fringe pattern. As the OAM quantum number increase, the annular radius increase. The OAM quantum number can be determined by counting the number of arms in the fringe pattern. The SAM of the non-separable TAM states are either $+\hbar$ or $-\hbar$ because of the circular polarization states.

The non-separable TAM states measurement results in the case of $J_1J_2|\Psi\rangle$ that shows in FIG. 12b. In this case, the incidence passes through $J_1$ after $J_2$. The possible generated OAM states are similar to that of $J_2J_1|\Psi\rangle$. Four pure OAM quantum numbers (m+p, n+p, m+q, and n+q) are demonstrated with circular polarization of incidence (either $|L\rangle$ or $|R\rangle$ ) and x-y linear polarization of analyzer (either $|x\rangle\langle x|$ or $|y\rangle\langle y|$). However, the SAM of output states are zero because of the linear polarization of analyzer.

The cascaded metasurfaces can convert any orthogonal polarizations to the other orthogonal polarizations and the latter is not limited to be the conjugate of the former. To map the generated TAM sates on HOPS, analyzer polarization as well as incidence polarization can be used. For example, the cascaded HOPS can use both the incidence and analyzer polarization. Also the superposition of several OAM states together and map the result on the cascaded HOPS can be demonstrated.

To study what kind of versatile TAM states can be generated, the process can start from the Dirac notation and Jones calculus. In the case of $J_2J_1$, it can be assumed that the polarization state of incidence is $|\Psi_i\rangle = |\alpha x+\beta y\rangle$ and analyzer is $|\Psi_a\rangle\langle\Psi_a| = |\gamma R+\eta L\rangle\langle\gamma R+\eta L|$. The output state $|\Psi_o\rangle$ can be written as:

$$|\Psi_o\rangle = |\Psi_a\rangle\langle\Psi_a|J_2J_1|\Psi_i\rangle$$
$$= ||\gamma R + \eta L\rangle\langle\gamma R + \eta L|J_2J_1|\alpha x + \beta y\rangle$$
$$= C[\gamma(\alpha|m + p\rangle - i\beta|n + p\rangle) - \eta(\alpha|m + q\rangle + i\beta|n + q\rangle)]|\gamma R + \eta L\rangle$$

where $\alpha$ and $\beta$ are normalized values for the incidence polarization, $\gamma$ and $\eta$ are normalized values for the analyzer polarization, and C is normalized value of the final state. In some embodiments, m, n, p, and q are 2, 3, 2, and 4. Therefore, the output state $|\Psi_o\rangle$ can be superposition of four states, $|4\rangle$, $|5\rangle$, $|6\rangle$, and $|7\rangle$, depend on the component of incidence and analyzer, that is ($\alpha$, $\beta$, $\gamma$, $\eta$). Besides, a cascaded HOPS can represent all the output TAM states shown in FIG. 13(a). The cascaded HOPS includes two Poincare spheres, one is for the incidence polarization $|\Psi_i\rangle$ (left sphere), the other is for the analyzer polarization $|\Psi_\alpha\rangle$ (right sphere). Therefore, any two points separately on etch sphere represent a set of ($\alpha$, $\beta$, $\gamma$, $\eta$) and an output TAM states.

Figure 13:
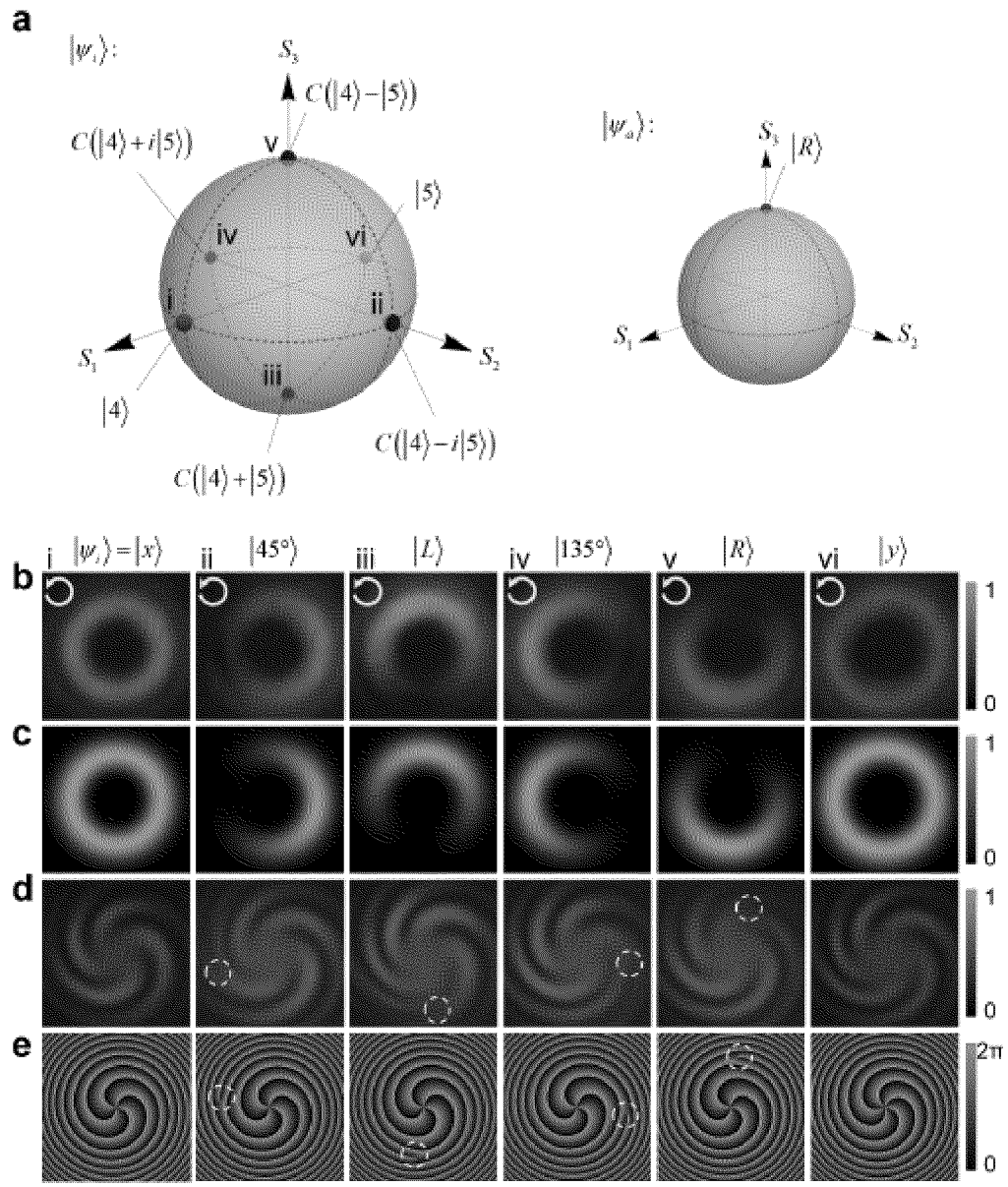
FIG. 13 shows TAM states represented by cascaded higher order Poincare sphere (HOPS). (a) The cascaded HOPS representing possible TAM states of J2J1 while analyzer is fixed as R. The cascaded HOPS contains one sphere for incidence polarization (left sphere) and the other for analyzer polarization (right sphere). Circles mark the mapping points of the results and respectively for the polarizations same and not same with the eigen-polarization state. (b-e) Measured intensity (b), calculated intensity (c), measured interferogram (d), and calculated phase (e) of the output states. The states in (b-e) i-vi are marked as circles on the cascaded HOPS in (a). The dashed circles in (d-e) label the position of off-axis singularity.

In FIG. 13, the analyzer polarization state is kept as $|R\rangle$ (($\gamma$, $\eta$)=(1, 0) one eigen-polarization state of $J_2$), and the incidence polarization state is changed, the output state can be obtained $|\Psi_o\rangle = C(\alpha|R\rangle |4\rangle - i\beta|R\rangle |5\rangle$ ). FIG. 13a shows the cascaded HOPS that possible TAM states mapping on. Six states (i-vi) are measured and calculated shown in FIGS. 13(b-e), while the mapping positions are marked in FIG. 13a. The spin (polarization state) and OAM information are labeled separately on two different sphere because they are separately determined by analyzer and incidence polarization state in this case. When the incidence polarization is one of the eigen-polarization state of $J_1$ (either $|x\rangle$ or $|y\rangle$, labeled circles), the output state is non-separable TAM state either $|R\rangle |4\rangle$ or $|R\rangle |5\rangle$. When the incidence polarization is an equal superposition of $|x\rangle$ and $|y\rangle$ with different phase, changing incidence to $|45°\rangle$, $|L\rangle$, $|135°\rangle$, and $|R\rangle$ for instance, a phase shift is introduced between $|R\rangle |4\rangle$ and $|R\rangle |5\rangle$. FIGS. 13b and 13c are measured and calculated intensity profiles of these states. Since the states (ii-v) are equal superposition of two states, there can be |4-5| additional off-axis singularity, resulting in null (minima intensity) at intensity pattern (FIGS. 13b(ii-v) and 13c(ii-v)) and an off-axis fork in the interference pattern (dashed circle in FIG. 13d(ii-v)). The positions of calculated nodes, and phase singularities in FIGS. 13c(ii-v) and 13e(ii-v) match well to the measurement results.

Notably it can be observed the rotation angle of null intensity ($\Phi_n$) the same with the angular distance (or angular separation shift) on PS $\Phi$. For instance, position shift from (ii) to (iii) on PS, $\Theta$=90°. And the null on intensity pattern rotates 90 degrees as well. The angular distance $\Theta$ can be azimuthal angle 2$\chi$ along equator or polar angle $\delta$ along longitude on the Poincare sphere. For superposition of any two different OAM quantum numbers $\ell_1$ and $\ell_2$, the null intensity rotation rate can be generally written:

$$\frac{\partial \Phi_n}{\partial \Theta} = \frac{1}{|\ell_1 - \ell_2|}.$$

It can be easier understood: The null intensity should rotate $2\pi$ to the same position while the angular distance moves $2\pi$ to the same point on Poincare sphere. Extending to any OAM quantum number difference $\Delta \ell$, null intensity can rotate $2\pi/\Delta\ell$ to the symmetry position while the angular distance moves $2\pi$. This relation is demonstrated along longitude of Poincare sphere here.

Figure 14:
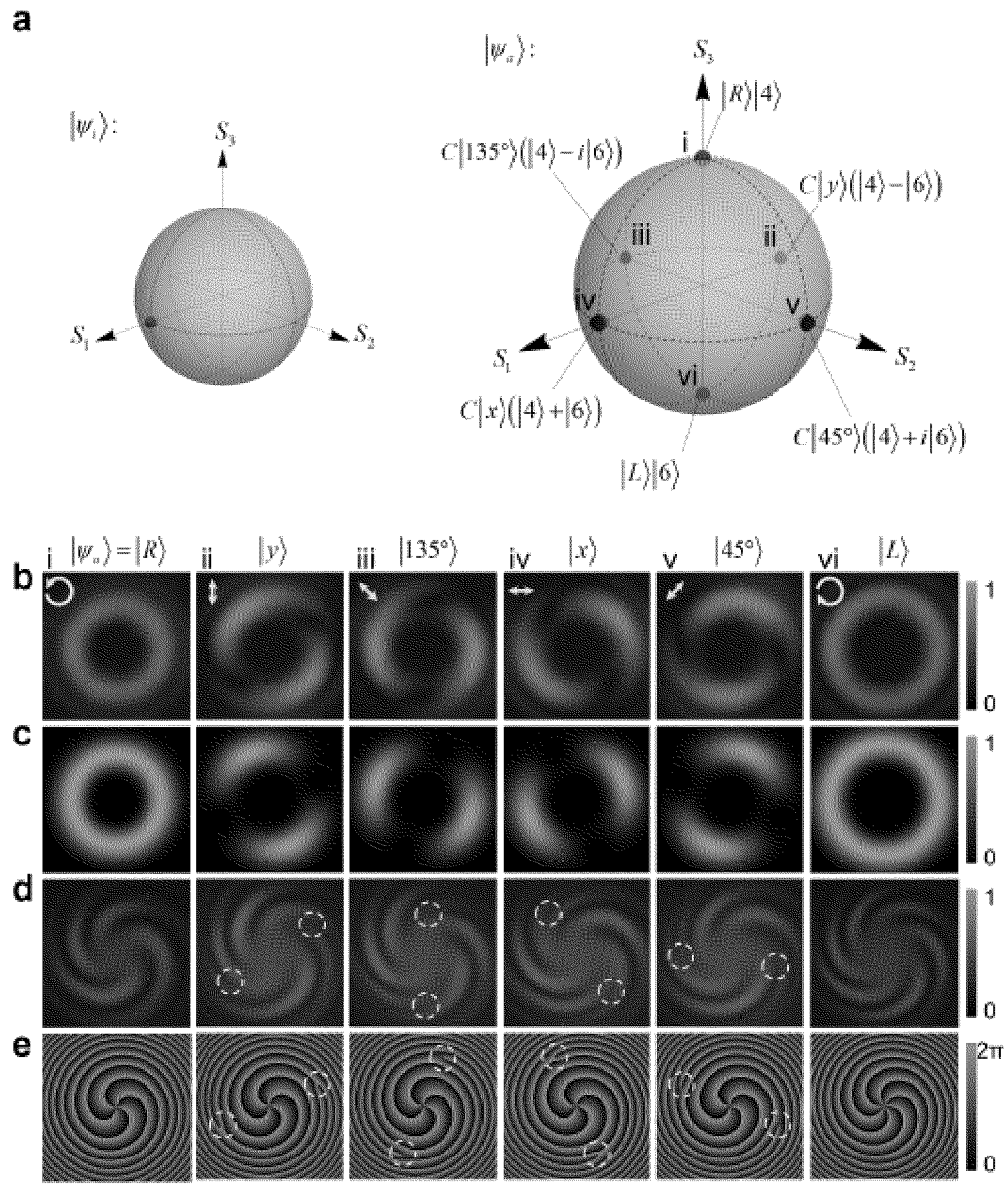
FIG. 14 shows a TAM mapping with a specific incidence polarization state. (a) The cascaded HOPS representing possible TAM states of J2J1 while incidence is fixed as |x>. Here the possible generated TAM states are mainly mapping on the analyzer sphere. (b-e) Measured intensity (b), calculated intensity (c), measured interferogram (d), and calculated phase (e) of the output states. The states in (b-e) i-vi are marked as circles on the cascaded HOPS in (a). The white dashed circles in (d-e) label the position of off-axis singularity.

TAM states can map not only on analyzer sphere but also on incidence sphere. FIG. 14 shows another case of TAM mapping, where incidence polarization state is kept as $|x\rangle$ $(\alpha, \beta)=(1,0)$, one of the eigen-polarization states of $J_1$, and change the analyzer polarization to generate TAM states mapping on the analyzer sphere. Six states (i-vi) are measured and calculated shown in FIGS. 14(b-e), while the mapping positions are marked in FIG. 14a. Differently, the spin (polarization state) and OAM information are labeled together on analyzer sphere because they are both determined analyzer in this case. When the analyzer polarization is one of the eigen-polarization states of $J_2$ (either $|R\rangle$ or $|L\rangle$, labeled circles), the output state is non-separable TAM state either $|R\rangle|4\rangle$ or $|L\rangle|6\rangle$. Changing the angle of linear polarization ($|y\rangle$, $|135°\rangle$, $|x\rangle$, and $|45°\rangle$) introduce a phase shift between the $|R\rangle|4\rangle$ and $|L\rangle|6\rangle$ in the superposition. Two different OAM quantum numbers makes two off-axis singularity in phase profile (FIG. 4e (ii-v)), two off-axis null in intensity pattern (FIGS. 4b and 4c (ii-v)), and two off-axis fork in the measured interference (FIG. 4d (ii-v)). The rotation angle of the null intensity $\Phi_n$ is observed half of the angular position shift on Poincare sphere.

Figure 15:
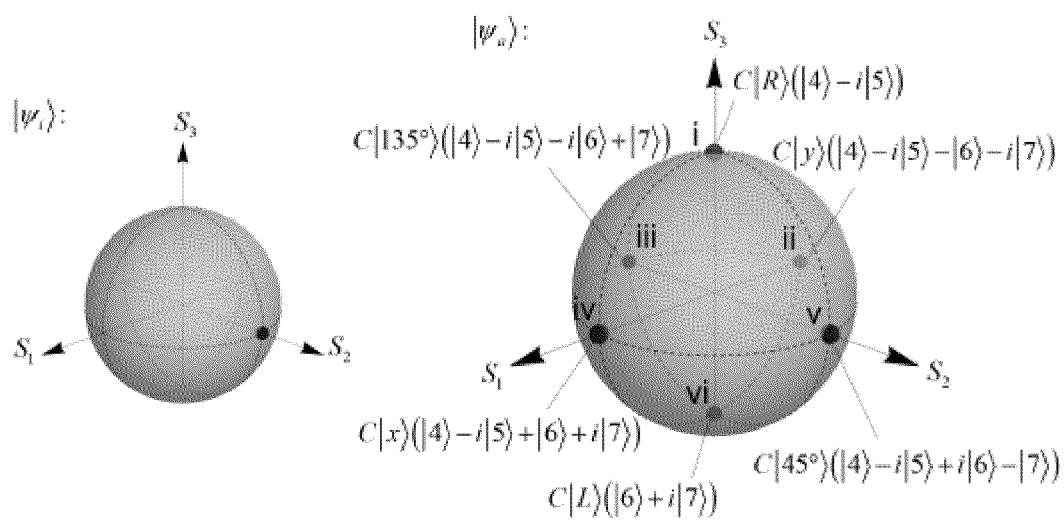
FIG. 15 shows a superposition case. (a) The cascaded HOPS representing possible TAM states of J2J1 while incidence is fixed as |45>. (b-e) Measured intensity (b), calculated intensity (c), measured interferogram (d), and calculated phase (e) of the output states. The states in (b-e) i-vi are marked as circles on the cascaded HOPS in (a). The dots in (b-e) label the position of off-axis singularity.
Figure 15:
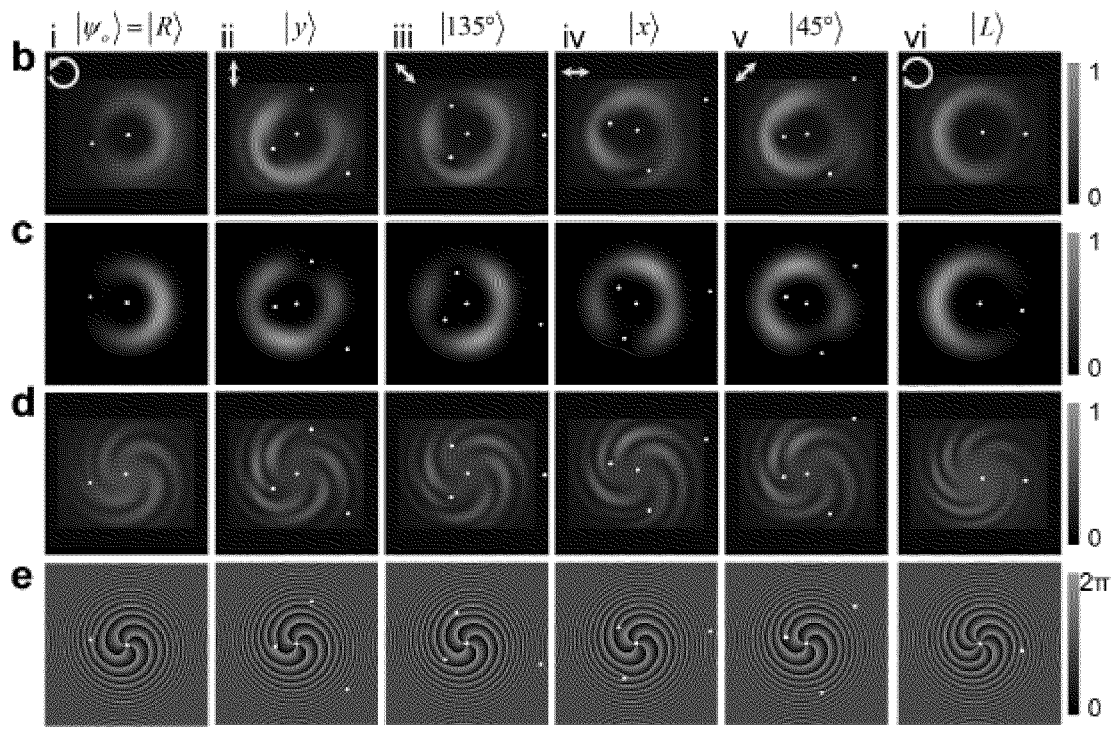
Figure 16:
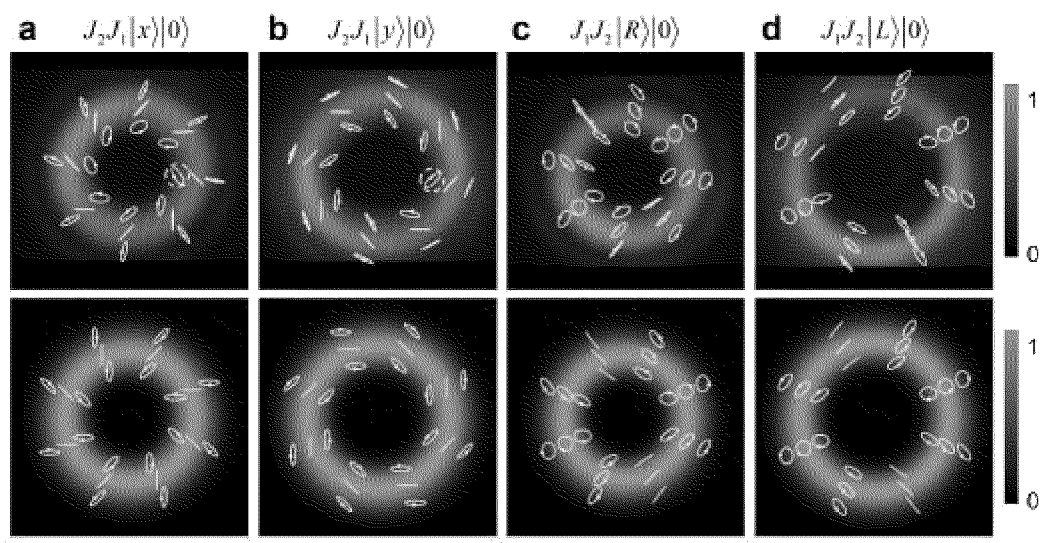
FIG. 16 shows intensity profiles of TAM states and polarization diagrams. The measured (top row) and calculated (bottom row) intensity profile of 4 TAM states and the polarization diagrams. (a) Superposition of |R>|4> and |L>|6> exited by J2 J1|x>|0>. (b) Superposition of |R>|5> and |L>|7> exited by J2 J1 |y>|0>. (c) Superposition of |x>|4> and |y>|5> exited by J1 J2 |L>|0>. (d) Superposition of |x>|6> and |y>|7> exited by J1 J2 |R>|0>.

Superposition of 4 TAM states are also demonstrated. FIG. 15 shows one of the superposition case of $J_2J_1$ where the incidence polarization is fixed as $|45°\rangle$ and analyzer polarization is changed. The output state is $|\Psi_\alpha\rangle=C|\gamma R+\eta L\rangle$ ($\gamma|4\rangle-i\gamma|5\rangle-\eta|6\rangle-i\eta|7\rangle$). The generated superposition of 4 non-separable TAM states are mapped on the cascaded HOPS shown in FIG. 15a. Since the incidence polarization is not one of the eigen-polarization states of $J_1$, both $|x\rangle|2\rangle$ and $|y\rangle|3\rangle$ are generated from $J_1$ and becomes incidence of $J_2$. Both of $|x\rangle$ and $|y\rangle$ are not eigen-polarization states of $J_2$, resulting in simultaneous generation of four kind of non-separable TAM states. If selecting either $|R\rangle$ or $|L\rangle$ as analyzer polarization, only superposition of two non-separable TAM states is able to generate, which is $C[|R\rangle|4\rangle-i|R\rangle|5\rangle]$ or $C[|L\rangle|6\rangle+i|L\rangle|7]$ respectively. In the more general case where the analyzer polarization is a superposition of $|R\rangle$ and $|L\rangle$ (points other than the north and south poles on the Poincare sphere), the output state includes all four possible TAM states. FIGS. 16(b-e) show the experimental and calculated results. The white dots label the position of singularities. The off-axis singularity number equals the difference of smallest and largest OAM quantum number. It is because, in this case, there is 4 multiples of $2\pi$ in phase near the center but 7 far away from the center. Therefore, three singularities can be observed in the phase profile (FIG. 16e(ii-v)). Notably, there is no rotation symmetry between the states (ii-v) in FIGS. 15(b-e).

Besides of non-separable or separable TAM states mapping on cascaded HOPS, the cascaded J-plates can generate vector vortex beam as well. Here the local polarization state in the case of superposition of two non-separable TAM states is investigated. FIG. 16a shows the measured (top) and calculated (bottom) intensity pattern and polarization diagram of superposition of $|R\rangle|4\rangle$ and $|L\rangle|6\rangle$. In principle, two kind of different polarization states are incoherence unless projected to a same polarization state using analyzer. If there is no analyzer, directly superposing TAM states $|R\rangle|4\rangle$ and $|L\rangle|6\rangle$ results in sum of the two annular intensity profiles, an wider annular intensity profile, shown in FIG. 16a. Notably the polarization at inner and outer radius should be different because the radius of annular intensity profile of $|R\rangle|4\rangle$ and $|L\rangle|6\rangle$ are different. Any local polarization state can analyzed by projecting it to 6 polarization states $|x\rangle$, $|y\rangle$, $|45°\rangle$ $|135°\rangle$ $|R\rangle$, and $|L\rangle$ (FIG. 14b). The Stock vector at each position $|S\rangle$ (x, y) can be calculated from the 6 measured local power $|P\rangle$ (x, y).

$$|P\rangle = \begin{bmatrix} P_x \\ P_y \\ P_{45} \\ P_{135} \\ P_L \\ P_R \end{bmatrix} = \begin{bmatrix} 1 & 1 & 0 & 0 \\ 1 & -1 & 0 & 0 \\ 1 & 0 & 1 & 0 \\ 1 & 0 & -1 & 0 \\ 1 & 0 & 0 & 1 \\ 1 & 0 & 0 & -1 \end{bmatrix} \begin{bmatrix} S_0 \\ S_1 \\ S_2 \\ S_3 \end{bmatrix} = A|S\rangle,$$

$$|S\rangle = (A^T A)^{-1} A^T |P\rangle$$

As results, the arrows on FIG. 16a shows the local polarization diagrams of $|R\rangle|4\rangle+|L\rangle|6\rangle$ RCP and LCP respectively dominate the inner and outer radius of annular pattern. At the middle radius, RCP and LCP components equally contribute intensity, resulting in linear polarization.

Figure 6:
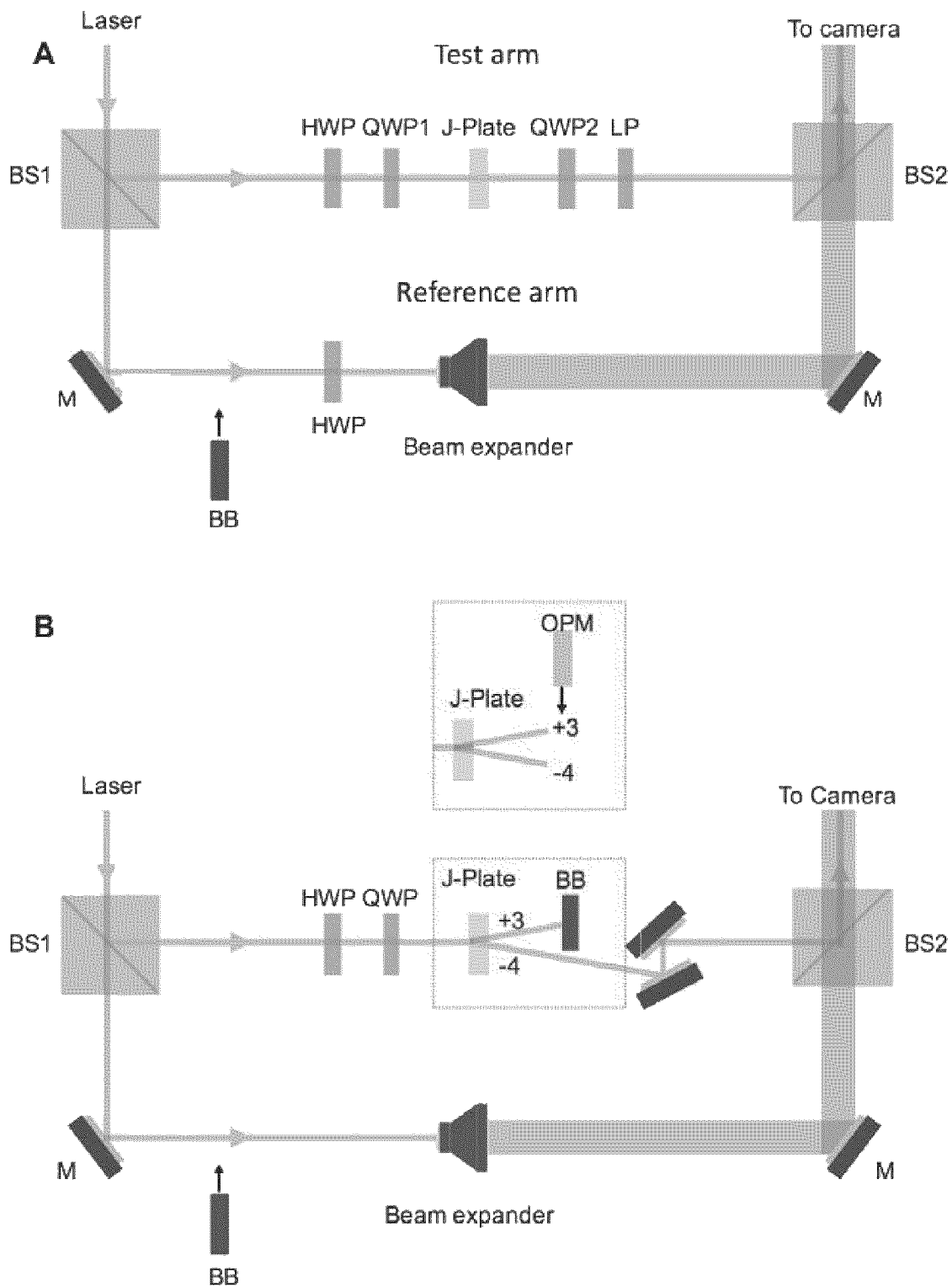
FIG. 6 shows measurement setups for experimental verification of J-plate operation. (A) Measurement setup for verification of the device corresponding to FIGS. 2 and 3 in the main text. (B) Measurement setup for the device corresponding to FIG. 4 in the main text. BS=beamsplitter, M=mirror, HWP=halfwave plate, QWP=quarterwave plate, BB=beam block, LP=linear polarizer, OPM=optical power meter.
Figure 7A:
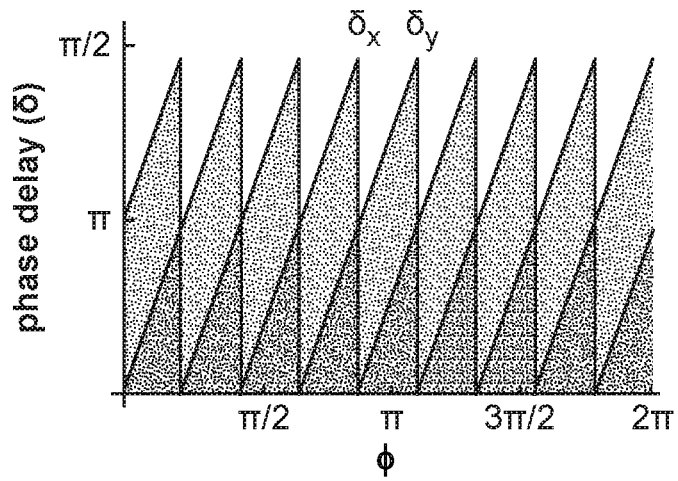
FIG. 7 shows device design for mapping from circularly-polarized inputs to OAM with m=+6 and n=+3. (A) Phase delays as a function of azimuthal angle. (B) Rotation angle of the birefringent element as a function of azimuthal angle. (C) Actual device design after periodically sampling the two functions of (A) and (B).
Figure 7B:
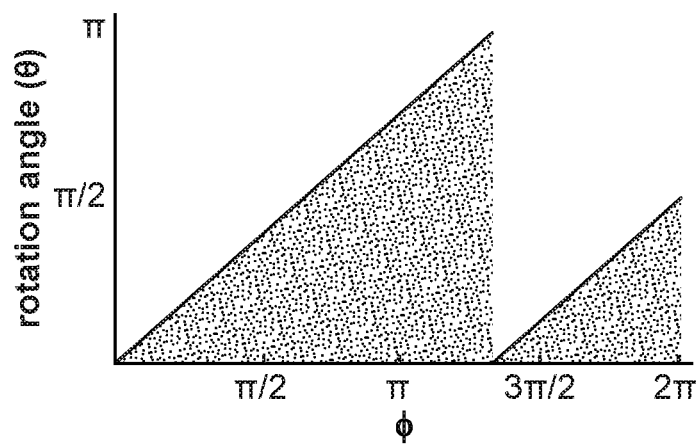
Figure 7C:
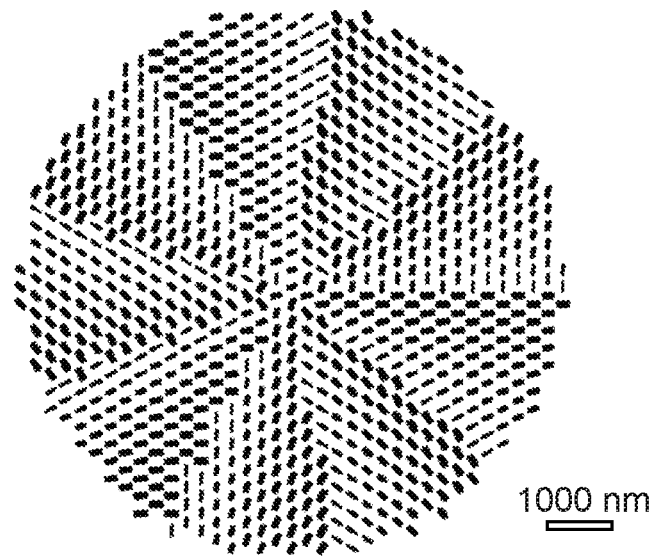
Figure 8A:
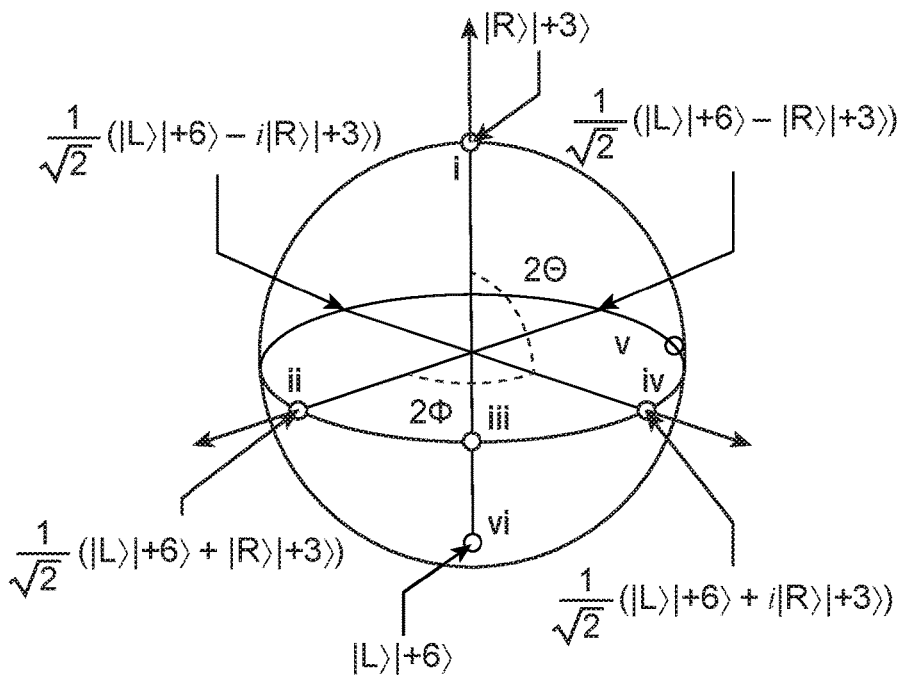
FIG. 8 shows experimental demonstration of superposition of two arbitrary orbital angular momenta with circularly polarized eigenstates. (A). Higher order Poincare sphere (HOP) representing all possible spin and orbital angular momentum states produced by a device that carries out the mapping $|R\rangle \rightarrow |L\rangle|+6\rangle$ And $|L\rangle \rightarrow |R\rangle|+3\rangle$. (B). Measured intensity of output state. (C) Measured interference of output state with a Gaussian. The states in (B,C) i-vi are marked as circles on the HOP in (A). (D,E) Magnified view of measured intensity and interference of the states in (B)iii and (C)iii. The dashed boxes highlight an additional zero in intensity and phase discontinuity that results from the equal superposition of $|+3\rangle$ and $|+6\rangle$ states. This phase discontinuity results in an three off-axis zeros in the intensity pattern (F) and three additional forks in the interference pattern corresponding to the difference of OAM for the two states. The scale bar shows the value of phase.
Figure 8B:
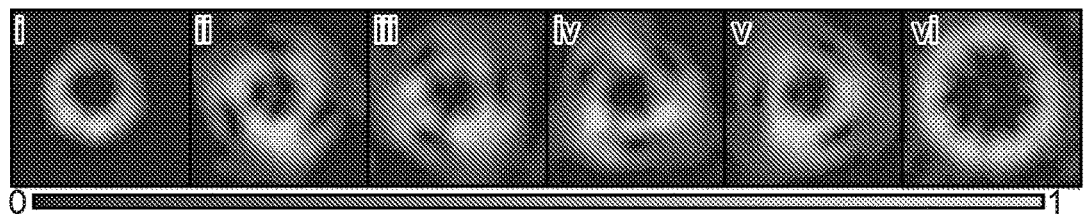
Figure 8C:
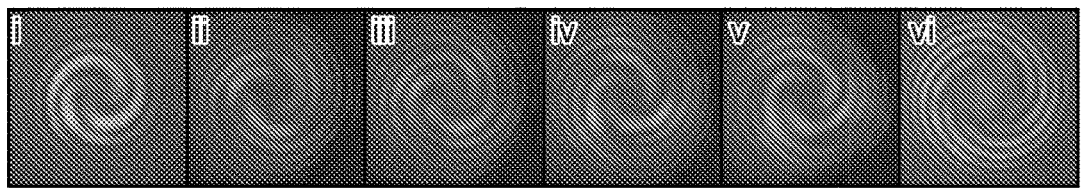
Figure 8E:
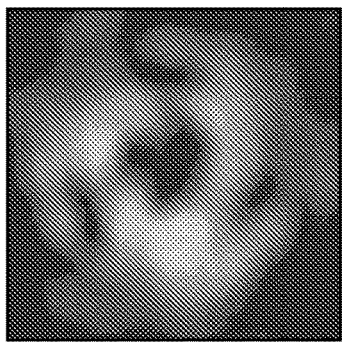
Figure 8F:
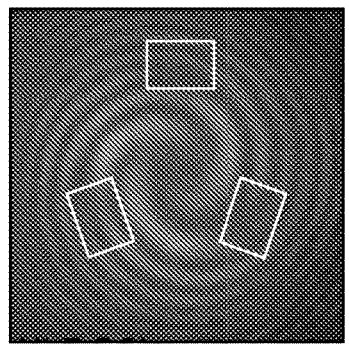
Figure 9:
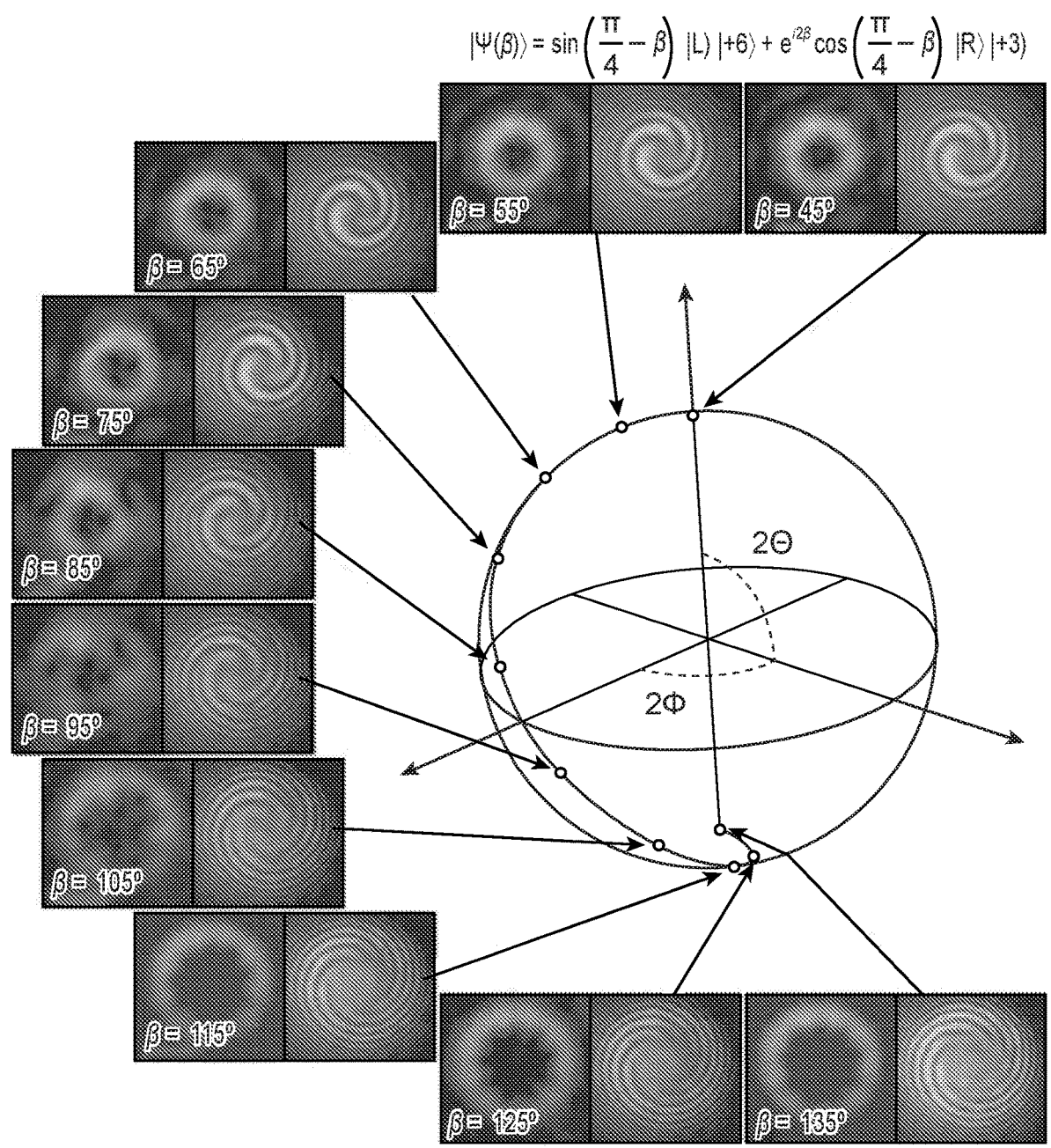
FIG. 9 shows evolution of an arbitrary OAM superposition along a path on the higher order Poincare sphere. The images show measured output intensities (left) and interference (right) as the angle of the fast axis of a QWP is varied in front of a horizontally-polarized laser. The angle is varied from $\beta=45$ degrees to $-45$ degrees which transfers the output state from the north pole to the south pole while continuously changing both the weight and phase of the superposition state. The QWP angle for each intensity and interference image is displayed in the bottom left. The output state $|\Psi\rangle$ as a function of $\beta$, is shown at the top. The resulting path taken on the HOP is shown as the line and the circles correspond to the measured points.

FIG. 16b shows the results of superposition of $|R\rangle|5\rangle$ and $|L\rangle|7\rangle$; where RCP and LCP respectively dominate the inner and outer radius of annular pattern as well. However, the polarization diagram of each labeled position is quite different to that of in FIG. 6a. For incidence, comparing to the position white dashed circle labeled in FIGS. 16a and 16b. elliptical polarization shows combination of $|135\rangle$ and $|R\rangle$ in FIGS. 16a and $|45\rangle$ and $|R\rangle$ in FIG. 16b. It comes from the different initial phase between superposition of two states. The initial phase between $|R\rangle|4\rangle$ and $|L\rangle|6\rangle$ is $\pi$ while that of $|R\rangle|5\rangle$ and $|L\rangle|7\rangle$ is zero. The measured polarization diagrams are calculated from the 6 measured projected states shown in Supporting Information.

$$|\gamma R + \eta L\rangle\langle\gamma R + \eta L|J_2J_1|x\rangle|0\rangle = C[\gamma|4\rangle - \eta|6\rangle]|\gamma R + \eta L\rangle$$

$$|\gamma R + \eta L\rangle\langle\gamma R + \eta L|J_2J_1|y\rangle|0\rangle = C[\gamma|5\rangle + \eta|7\rangle]|\gamma R + \eta L\rangle$$

FIGS. 16c and 16d show the results for superposition of $|x\rangle|4\rangle$ and $|x\rangle|5\rangle$ and $|x\rangle|6\rangle$ and $|x\rangle|6\rangle$. The measured polarization diagrams are calculated from the 6 measured projected states shown in Supporting Information. Linear polarization are observed at upper left and lower right corner. RCP dominates at upper right in FIG. 16c and lower right in FIG. 16d while LCP dominates at opposite position.

Therefore, in at least some embodiments of the present disclosure, cascaded J-plates in different eigen-polarization states are designed and fabricated and the output polarizations are not limited to be conjugate of input polarizations. It is demonstrated versatile TAM modes, includes non-separable and separable TAM modes, mapping on the cascaded higher-order Poincaré sphere. Cascaded 2 J-plates can generate 8 kinds of non-separable TAM modes, 8 kinds of 2-states-superposition, 8 kinds of 4-states-superposition, and 4 kind of vector vortex beams. There is also possible to cascaded more than two J-plates. It is demonstrated that the analytic method can be extend to more than two cascaded metasurfaces. A single layer metasurface can be designed for generating any one kind of TAM states or vector vortex beams. Cascaded metasurfaces provides more degrees of freedom, such as incidence states, analyzer states, order of metasurfaces, etc., to select or generate more possible TAM states, vector vortex beams, and further more complex structure light.

It is to be understood that the term "design" or "designed" (e.g., as used in "design wavelength," "design focal length" or other similar phrases disclosed herein) refers to parameters set during a design phase; which parameters after fabrication may have an associated tolerance.

In some embodiments, a metasurface includes a substrate and a plurality of nanostructures on the substrate. The substrate may be, for example, a glass (e.g., silica ($SiO_2$)) substrate. In some embodiments, in addition or alternative to $TiO_2$, nanostructures may include other suitable dielectric materials including those having a light transmittance over a design wavelength or a range of design wavelengths of at least about 40%, at least about 50%, at least about 60%, at least about 70%, at least about 80%, at least about 85%, at least about 90%, or at least about 95%. For example, other suitable dielectric materials can be selected from oxides (such as an oxide of aluminum (e.g., $Al_2O_3$), silicon (e.g., $SiO_2$), hafnium (e.g., $HfO_2$), zinc (e.g., ZnO), magnesium (e.g., MgO), or titanium (e.g., $TiO_2$)), nitrides (such as nitrides of silicon (e.g., $Si_3N_4$), boron (e.g., BN), or tungsten (e.g., WN)), sulfides and pure elements. In some embodiments, a cross-section of each nanostructure has a two-fold symmetry, such as rectangular or elliptical.

As used herein, the singular terms "a," "an," and "the" may include plural referents unless the context clearly dictates otherwise.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated by such arrangement.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to #1%, less than or equal to ±0.5%, less than or equal to ±0.1%, or less than or equal to ±0.05%. For example, two numerical values can be deemed to be "substantially" the same if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An optical device, comprising:
    a first J-plate configured to convert an incident light state into multiple pure total angular momentum (TAM) states or a superposition of the multiple pure TAM states; and
    a second J-plate cascaded with the first J-plate and configured to convert the multiple pure TAM states into multiple design TAM states or a combination of the multiple design TAM states;
    wherein the first J-plate or the second J-plate transfers orthogonal polarized states to associated conjugate orthogonal polarized states with different orbital angular momentum (OAM) states.

2. The optical device of claim 1, wherein the second J-plate has an eigen-polarization state different from an eigen-polarization state of the first J-plate.

3. The optical device of claim 1, further comprising:
    an analyzer including a polarizer configured to filter out linear polarization state.

4. The optical device of claim 1, further comprising:
    an analyzer including a quarter wave plate and a polarizer configured to filter out circular or elliptical polarization state.

5. The optical device of claim 1, wherein the design TAM states include non-separable OAM states, superposition of two OAM states, superposition of four OAM states, vector vortex beam, or a symmetric rotation patterns from different phase shift in superposition.

6. The optical device of claim 5, wherein the spin state of the OAM states depends on an order of the first J-plate and the second J-plate.

7. The optical device of claim 1, wherein an output of the second J-plate cascaded with the first J-plate depends on an eigen-polarization state of the second J-plate.

8. The optical device of claim 1, wherein the first J-plate or the second J-plate is a spin-to-orbital angular momentum converter.

9. The optical device of claim 1, wherein the multiple design TAM states include non-separable TAM modes or separable TAM modes.

10. The optical device of claim 9, wherein the non-separable TAM modes or separable TAM modes are mapped on a cascaded higher-order Poincare sphere (HOPS).

11. The optical device of claim 1, wherein:
the first J-plate comprises a first metasurface including a first plurality of nanostructures; and
the second J-plate comprises a second metasurface including a second plurality of nanostructures.

12. The optical device of claim 11, wherein the first plurality of nanostructures are configured to convert an input light of an arbitrary spin state into an output light of an arbitrary TAM state characterized by a superposition of two OAM states.

13. The optical device of claim 12, wherein the input light is a left-circularly or right-circularly polarized light.

14. The optical device of claim 12, wherein the output light is a helical beam with independent values of OAM.

15. The optical device of claim 12, wherein the input light is of an orthogonal elliptical polarization state.

16. The optical device of claim 12, further comprising:
an encoding device configured to encode information as angular momentums of the output light.

17. The optical device of claim 12, further comprising:
a high numerical aperture lens focusing the output light such that helical modes of the output light have non-trivial field distributions.

18. The optical device of claim 12, further comprising:
a laser light emitter configured to generate the input light.

* * * * *